US009999069B2

(12) United States Patent
Nair et al.

(10) Patent No.: US 9,999,069 B2
(45) Date of Patent: Jun. 12, 2018

(54) MU-MIMO DYNAMIC BANDWIDTH SELECTION

(71) Applicant: QUALCOMM Incorporated, San Diego, CA (US)

(72) Inventors: Madhavan Nair, Sunnyvale, CA (US); Pradeep Baliganapalli Nagaraju, San Francisco, CA (US); Qinghai Gao, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 15/087,848

(22) Filed: Mar. 31, 2016

(65) Prior Publication Data

US 2017/0290045 A1    Oct. 5, 2017

(51) Int. Cl.
| | |
|---|---|
| *H04W 4/00* | (2018.01) |
| *H04W 72/12* | (2009.01) |
| *H04B 7/0452* | (2017.01) |
| *H04L 5/00* | (2006.01) |
| *H04W 28/26* | (2009.01) |

(Continued)

(52) U.S. Cl.
CPC ...... *H04W 72/1278* (2013.01); *H04B 7/0452* (2013.01); *H04L 5/0044* (2013.01); *H04L 5/0051* (2013.01); *H04L 27/0006* (2013.01); *H04W 28/26* (2013.01); *H04W 40/16* (2013.01); *H04W 72/0453* (2013.01);

(Continued)

(58) Field of Classification Search
CPC ......... H04W 72/1278; H04W 72/0453; H04W 28/044; H04W 28/26; H04W 40/16; H04W 84/12; H04W 88/08; H04B 7/0452; H04L 5/0051

USPC .......................................................... 370/329
See application file for complete search history.

(56) References Cited

U.S. PATENT DOCUMENTS

| 8,705,443 B2 | 4/2014 | Tang et al. | |
|---|---|---|---|
| 8,995,564 B2 * | 3/2015 | Liu ....................... | H04L 5/0023 375/295 |

(Continued)

FOREIGN PATENT DOCUMENTS

| WO | WO 2015038175 A1 * | 3/2015 | ............ H04W 28/20 |
|---|---|---|---|
| WO | WO-2015038175 A1 | 3/2015 | |

(Continued)

OTHER PUBLICATIONS

International Search Report and Written Opinion—PCT/US2017/015835—ISA/EPO—dated Jun. 12, 2017.

(Continued)

*Primary Examiner* — Peter Cheng
(74) *Attorney, Agent, or Firm* — Paradice an Li LLP/Qualcomm

(57) ABSTRACT

Apparatuses and methods are disclosed that may allow a wireless device to dynamically select a bandwidth for MU-MIMO communications. A wireless device may transmit, on each of a plurality of wireless channels, a clear-to-send-to-self (CTS2S) frame that reserves medium access on a number of wireless channels and/or confirms the continued availability of the wireless channels. The bandwidth for a subsequent sounding operation may be based on the bandwidth used to transmit the CTS2S frames. Thereafter, the wireless device may transmit one or more MU-MIMO data frames to a number of other wireless devices using the selected bandwidth.

26 Claims, 13 Drawing Sheets

(51) Int. Cl.
*H04W 40/16* (2009.01)
*H04W 72/04* (2009.01)
*H04L 27/00* (2006.01)
*H04W 74/08* (2009.01)
*H04W 84/12* (2009.01)
*H04W 88/08* (2009.01)

(52) U.S. Cl.
CPC ......... *H04W 74/085* (2013.01); *H04L 5/0023* (2013.01); *H04W 84/12* (2013.01); *H04W 88/08* (2013.01)

(56) References Cited

U.S. PATENT DOCUMENTS

| | | |
|---|---|---|
| 9,124,387 B2 | 9/2015 | Lin et al. |
| 9,160,503 B2 | 10/2015 | Kim et al. |
| 2006/0159003 A1 | 7/2006 | Nanda et al. |
| 2008/0112380 A1* | 5/2008 | Fischer ............. H04W 74/0816 370/338 |
| 2013/0058239 A1* | 3/2013 | Wang ................... H04B 7/0417 370/252 |
| 2013/0215947 A1* | 8/2013 | Yao ...................... H04B 7/0617 375/224 |
| 2014/0254517 A1* | 9/2014 | Nam .................... H04B 7/0417 370/329 |
| 2015/0146678 A1* | 5/2015 | Kondylis .............. H04L 5/0073 370/330 |
| 2015/0319784 A1 | 11/2015 | Bhushan et al. |
| 2016/0330047 A1 | 11/2016 | Seok |

FOREIGN PATENT DOCUMENTS

| | | |
|---|---|---|
| WO | WO-2015102180 A1 | 7/2015 |
| WO | WO-2015130336 A1 | 9/2015 |
| WO | WO-2016021994 A1 | 2/2016 |

OTHER PUBLICATIONS

International Search Report and Written Opinion—PCT/US2017/015835—ISA/EPO—dated Nov. 2, 2017.

* cited by examiner

MU-MIMO DYNAMIC BANDWIDTH SELECTION

TECHNICAL FIELD

The example embodiments relate generally to wireless networks, and specifically to transmitting data using multi-user multiple-input multiple-output (MU-MIMO) communications.

BACKGROUND OF RELATED ART

Wireless local area network (WLAN) systems may be formed by one or more access points (APs) that provide a shared wireless medium for use by a number of client devices or stations (STAs) to exchange data with each other and/or with devices external to the WLAN system. To improve data throughput, the shared wireless medium may be divided into a primary channel and one or more secondary channels. The primary and secondary channels may be of various bandwidths, for example, by bonding a number of 20 MHz-wide channels together to form 40 MHz-wide channels, 80 MHz-wide channels, and/or 160 MHz-wide channels.

In a typical WLAN, only one STA may use the wireless medium at any given time, and each STA may be associated with only one AP at a time. To prevent multiple STAs from accessing the shared wireless medium at the same time (which may result in collisions), STAs may contend with each other for access to the wireless medium or channel. Channel access mechanisms may be classified as either static or dynamic. In general, static channel access (SCA) mechanisms attempt to gain access to the entire bandwidth of the wireless medium, while dynamic channel access (DCA) mechanisms attempt to gain access to an available portion of the bandwidth of the wireless medium.

More specifically, a STA using an SCA mechanism typically attempts to transmit data using both the primary and secondary channels of the WLAN. If the secondary channel is busy, then the STA typically defers channel access (e.g., even if the primary channel is available) until the entire bandwidth is available. Thus, although SCA mechanisms may ensure maximum throughput by only using the entire frequency spectrum of the WLAN, frequent medium access deferrals resulting from traffic or interference on the shared wireless medium may reduce channel utilization.

In contrast, while a STA using a DCA mechanism may initially attempt to gain access to both the primary and secondary channels of the WLAN, if the secondary channel is busy and the primary channel is available, the STA may dynamically adjust its transmission bandwidth, for example, to begin data transmissions on the primary channel. Thus, although DCA mechanisms may not always achieve maximum throughput, medium utilization is improved (e.g., as compared with SCA mechanisms) by initiating data transmissions even when only the primary channel is available.

Wireless devices such as APs and STAs may use MU-MIMO communications to increase data throughput by transmitting multiple spatial streams to multiple users at the same time. However, hardware constraints may limit the ability of wireless devices to use conventional DCA mechanisms for MU-MIMO communications. As a result, wireless devices that utilize MU-MIMO communications may be limited to software-based SCA mechanisms, which as mentioned above may undesirably reduce utilization of the wireless medium. Thus, there is a need for wireless devices to dynamically adjust the bandwidth for MU-MIMO communications, for example, to improve medium utilization.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Apparatuses and methods are disclosed that may allow a wireless device to dynamically select a bandwidth for MU-MIMO communications. In one aspect, a method for selecting a bandwidth for MU-MIMO communications is disclosed. The method may be performed by a first wireless device and may include determining, during a medium access contention operation, whether one or more bandwidths are available; transmitting, during a transmit opportunity (TXOP), a clear-to-send-to-self (CTS2S) frame on the bandwidth determined to be available; selecting the bandwidth for the MU-MIMO communications based on the bandwidth used to transmit the CTS2S frames; and initiating the MU-MIMO communications using the selected bandwidth.

In another aspect, a wireless device is disclosed. The wireless device may include one or more processors and a memory configured to store instructions that, when executed by the one or more processors, cause the wireless device to select a bandwidth for MU-MIMO communications by determining, during a medium access contention operation, whether one or more bandwidths are available; transmitting, during a transmit opportunity (TXOP), a clear-to-send-to-self (CTS2S) frame on the bandwidth determined to be available; selecting the bandwidth for the MU-MIMO communications based on the bandwidth used to transmit the CTS2S frames; and initiating the MU-MIMO communications using the selected bandwidth.

In another aspect, a non-transitory computer-readable storage medium is disclosed. The non-transitory computer-readable storage medium may store one or more programs containing instructions that, when executed by one or more processors of a wireless device, cause the wireless device to select a bandwidth for MU-MIMO communications by performing a number of operations. The number of operations may include determining, during a medium access contention operation, whether one or more bandwidths are available; transmitting, during a transmit opportunity (TXOP), a clear-to-send-to-self (CTS2S) frame on the bandwidth determined to be available; selecting the bandwidth for the MU-MIMO communications based on the bandwidth used to transmit the CTS2S frames; and initiating the MU-MIMO communications using the selected bandwidth.

In another aspect, a wireless device for selecting a bandwidth for MU-MIMO communications is disclosed. The wireless device may include means for determining, during a medium access contention operation, whether one or more bandwidths are available; means for transmitting, during a transmit opportunity (TXOP), a clear-to-send-to-self (CTS2S) frame on the bandwidth determined to be available; means for selecting the bandwidth for the MU-MIMO communications based on the bandwidth used to transmit the CTS2S frames; and means for initiating the MU-MIMO communications using the selected bandwidth.

BRIEF DESCRIPTION OF THE DRAWINGS

The example embodiments are illustrated by way of example and are not intended to be limited by the figures of the accompanying drawings.

Like reference numerals refer to corresponding parts throughout the drawing figures.

DETAILED DESCRIPTION

Figure 1:
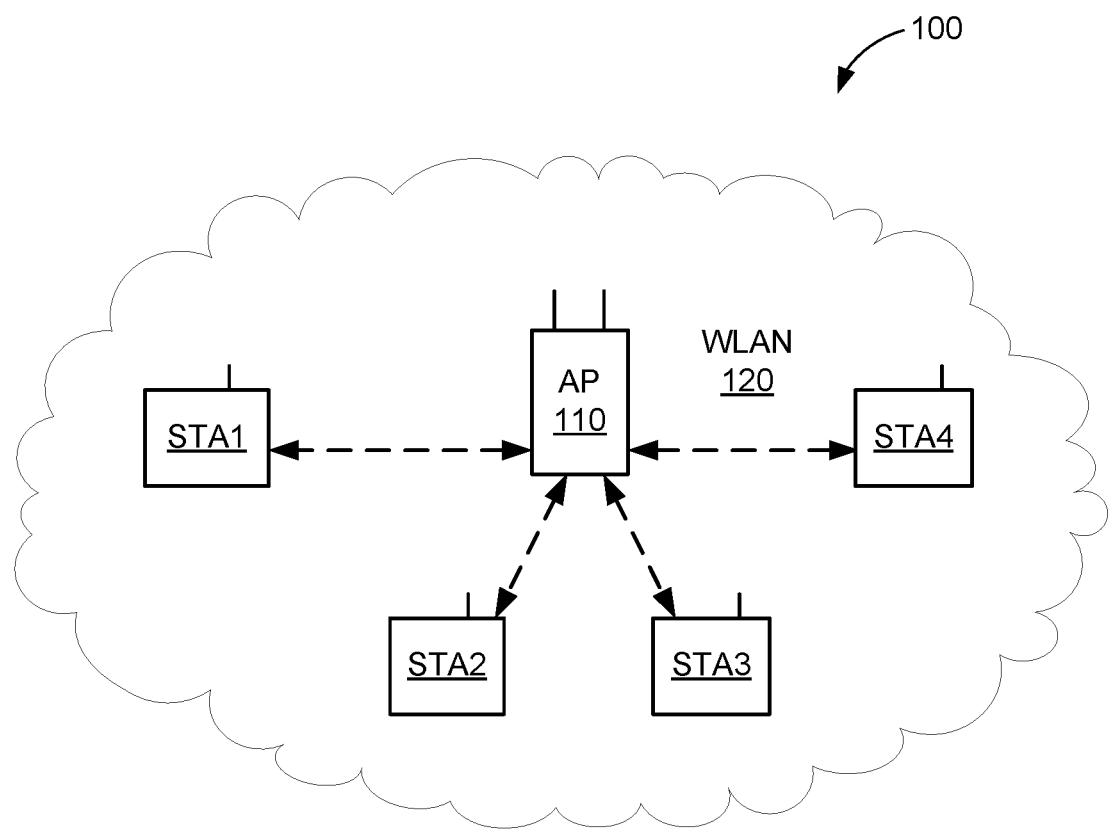
FIG. 1 shows a block diagram of a wireless system within which the example embodiments may be implemented.

The example embodiments described herein may increase wireless medium utilization for wireless devices that utilize MU-MIMO communications. As described in more detail below, wireless devices disclosed herein may selectively use static channel access (SCA) mechanisms and/or dynamic channel access (DCA) mechanisms when contending for access to a shared wireless medium, and may thereafter dynamically adjust the bandwidth used for MU-MIMO communications based, at least in part, on channel conditions. Because the shared wireless medium of a WLAN may be divided into a primary channel and one or more secondary channels of various bandwidths, the ability to quickly gain access to available channels of the wireless medium and then dynamically adjust the bandwidth of MU-MIMO communications may not only increase medium utilization but may also increase data throughput. These and other details of the example embodiments are described in more detail below.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots. In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. The term "associated AP" refers to an AP with which a given STA is associated (e.g., there is an established communication channel or link between the AP and the given STA). The term "non-associated AP" refers to an AP with which a given STA is not associated (e.g., there is not an established communication channel or link between the AP and the given STA, and thus the AP and the given STA may not yet exchange data frames). The term "associated STA" refers to a STA that is associated with a given AP, and the term "non-associated STA" refers to a STA that is not associated with the given AP.

Further, the term "goodput" may refer to an effective data rate of a wireless channel or link between two wireless devices (e.g., between a STA and an AP). For example embodiments, the goodput value of an AP may be indicative of the available bandwidth or medium share of a wireless channel upon which the AP operates. The term "sounding packet" may refer to a frame or packet that includes a predetermined pattern of information (e.g., a training sequence) that is known to a receiving device and that may be used as a basis for estimating channel conditions and/or goodput values of APs. For example, a null data packet (NDP), which does not contain data, may be used as a sounding packet. Thus, the term "NDP" may be used interchangeably with the term "sounding packet."

In addition, the term "narrowband wireless medium" may refer to a wireless medium having a 20 MHz bandwidth (e.g., a single 20 MHz channel), and the term "wideband wireless medium" may refer to a wireless medium having a bandwidth greater than 20 MHz that may be divided into a primary channel and one or more secondary channels (e.g., a primary 20 MHz channel, a secondary 20 MHz channel, and a secondary 40 MHz channel).

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The example embodiments are not to be construed as limited to specific examples described herein but rather to include within their scopes all embodiments defined by the appended claims.

FIG. 1 is a block diagram of a wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique media access control (MAC) address that is programmed therein by, for example, the manufacturer of the access point. Similarly, each of stations STA1-STA4 is also assigned a unique MAC address. For some embodiments, the wireless system 100 may correspond to a multiple-input multiple-output (MIMO) wireless network, and may support single-user MIMO (SU-MIMO) and multi-user MIMO (MU-MIMO) communications. Further, although the WLAN 120 is depicted in FIG. 1 as an infrastructure BSS, for other example embodiments, WLAN 120 may be an IBSS, an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each of stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each of stations STA1-STA4 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 9-11.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 9-11.

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band, within a 5 GHz frequency band in accordance with the IEEE 802.11 specification, and/or within a 60 GHz frequency band. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within each of the stations STA1-STA4 may be any technically feasible transceiver such as a ZigBee transceiver described by a specification from the ZigBee specification, a WiGig transceiver, and/or a HomePlug transceiver described a specification from the HomePlug Alliance.

Figure 2:
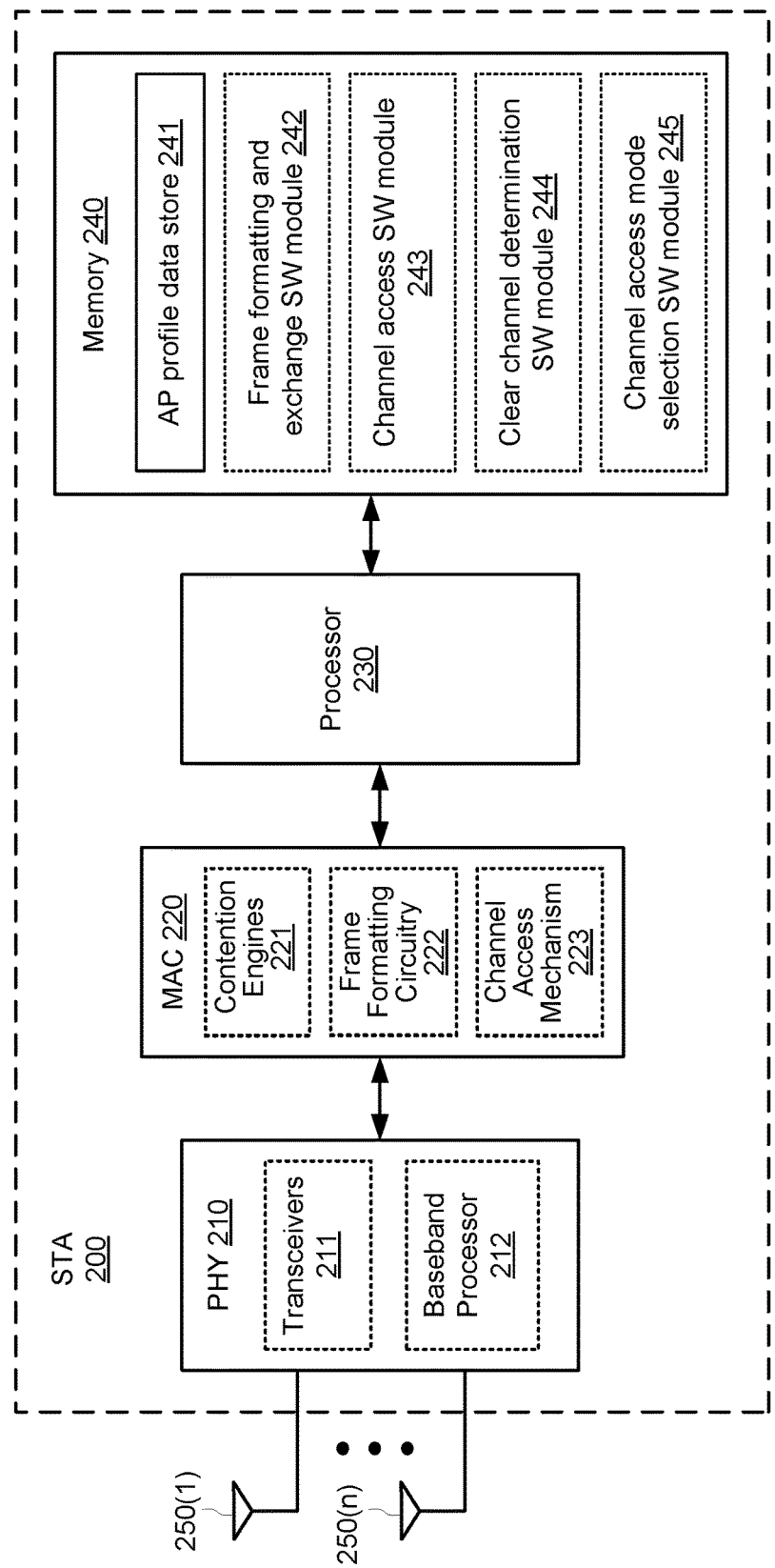
FIG. 2 shows a block diagram of a wireless station (STA) in accordance with example embodiments.

FIG. 2 shows an example STA 200 that may be one embodiment of one or more of the stations STA1-STA4 of FIG. 1. The STA 200 may include a PHY device 210, may include a MAC 220, may include a processor 230, may include a memory 240, and may include a number of antennas 250(1)-250(n).

The PHY device 210 may include at least a number of transceivers 211 and a baseband processor 212. The transceivers 211 may be coupled to antennas 250(1)-250(n), either directly or through an antenna selection circuit (not shown for simplicity). The transceivers 211 may be used to transmit signals to and receive signals from AP 110 and/or other STAs (see also FIG. 1), and may be used to scan the surrounding environment to detect and identify nearby access points and/or other STAs (e.g., within wireless range of STA 200). Although not shown in FIG. 2 for simplicity, the transceivers 211 may include any number of transmit chains to process and transmit signals to other wireless devices via antennas 250(1)-250(n), and may include any number of receive chains to process signals received from antennas 250(1)-250(n). Thus, for example embodiments, the STA 200 may be configured for MIMO operations. The MIMO operations may include SU-MIMO operations and MU-MIMO operations.

The baseband processor 212 may be used to process signals received from processor 230 and/or memory 240 and to forward the processed signals to transceivers 211 for transmission via one or more of antennas 250(1)-250(n), and may be used to process signals received from one or more of antennas 250(1)-250(n) via transceivers 211 and to forward the processed signals to processor 230 and/or memory 240.

Processor 230 may be any suitable one or more processors capable of executing scripts or instructions of one or more software programs stored in STA 200 (e.g., within memory 240). For purposes of discussion herein, MAC 220 is shown in FIG. 2 as being coupled between PHY device 210 and processor 230. For actual embodiments, PHY device 210, MAC 220, processor 230, and/or memory 240 may be connected together using one or more buses (not shown for simplicity).

The MAC 220 may include at least a number of contention engines 221, frame formatting circuitry 222, and a channel access mechanism 223. The contention engines 221 may contend for access to one more shared wireless mediums, and may also store packets for transmission over the one more shared wireless mediums. The STA 200 may include one or more contention engines 221 for each of a plurality of different access categories. For other embodiments, the contention engines 221 may be separate from MAC 220. For still other embodiments, the contention engines 221 may be implemented as one or more software modules (e.g., stored in memory 240 or stored in memory provided within MAC 220) containing instructions that, when executed by processor 230, perform the functions of contention engines 221.

The channel access mechanism 223 may contend for medium access using different bandwidths and/or may dynamically adjust the bandwidth used for some data transmissions. In some aspects, the channel access mechanism 223 may be implemented in hardware, may operate according to a dynamic channel access (DCA) mechanism, and may use the contention engines 221 to contend for medium access. In addition, the channel access mechanism 223 may initiate and/or control clear channel assessment (CCA) operations to determine the availability of a number of channels associated with the wireless medium. Although depicted in the example of FIG. 2 as included within MAC 220, for other embodiments, the channel access mechanism 223 may be separate from MAC 220.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

Memory 240 may include an AP profile data store 241 that stores profile information for a plurality of APs. The profile information for a particular AP may include, for example, the AP's service set identification (SSID), MAC address, channel information, received signal strength indicator (RSSI) values, goodput values, channel state information (CSI), supported data rates, connection history with the AP, a trustworthiness value of the AP (e.g., indicating a level of confidence about the AP's location, etc.), and any other suitable information pertaining to or describing the operation of the AP.

Figure 9:
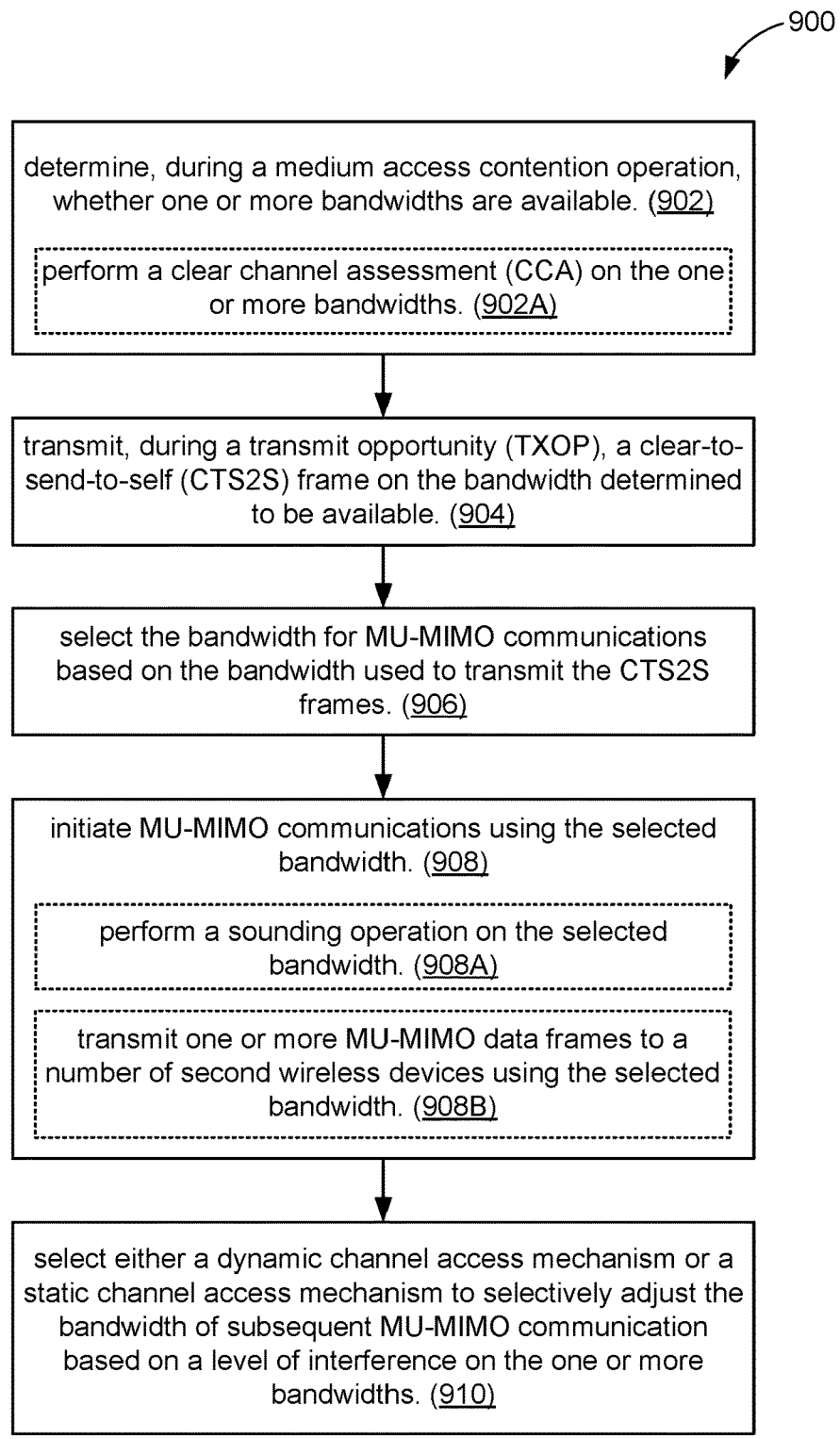
FIG. 9 shows an illustrative flow chart depicting an example operation for selecting a bandwidth for MU-MIMO communications in accordance with example embodiments.
Figure 10:
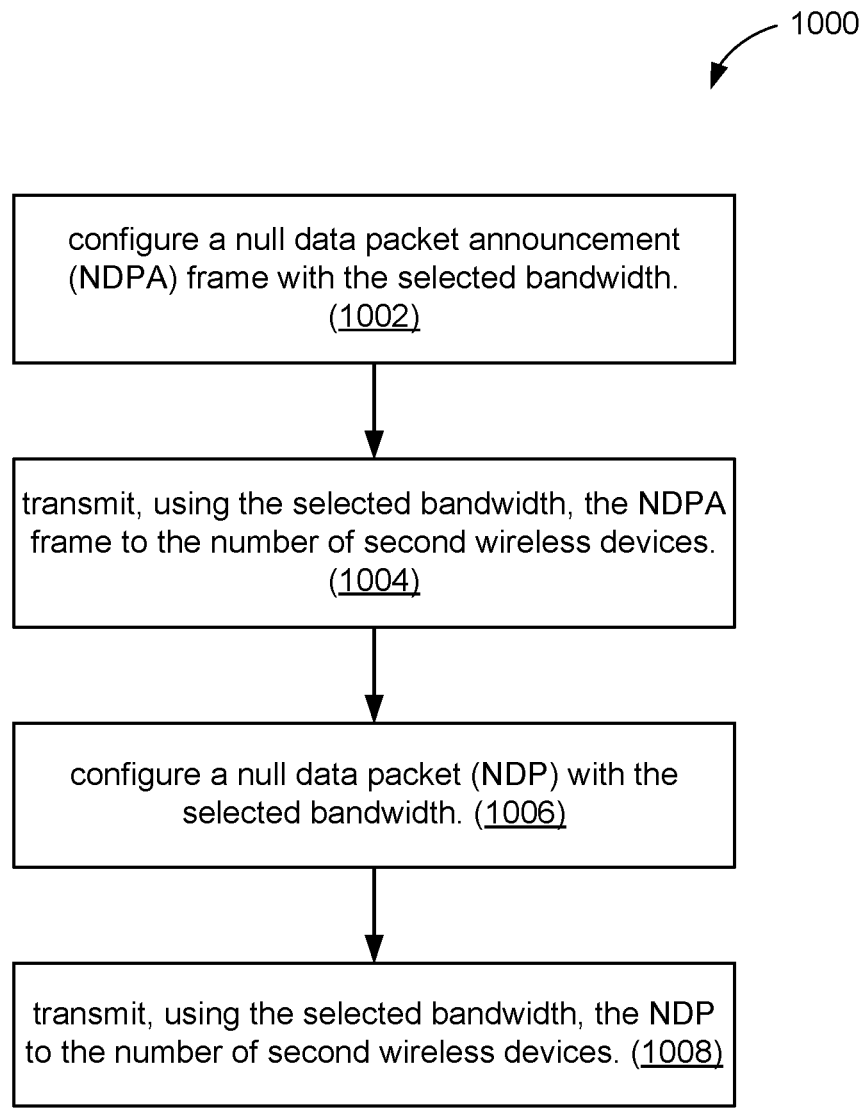
FIG. 10 shows an illustrative flow chart depicting an example operation for performing a sounding operation in accordance with example embodiments.
Figure 11:
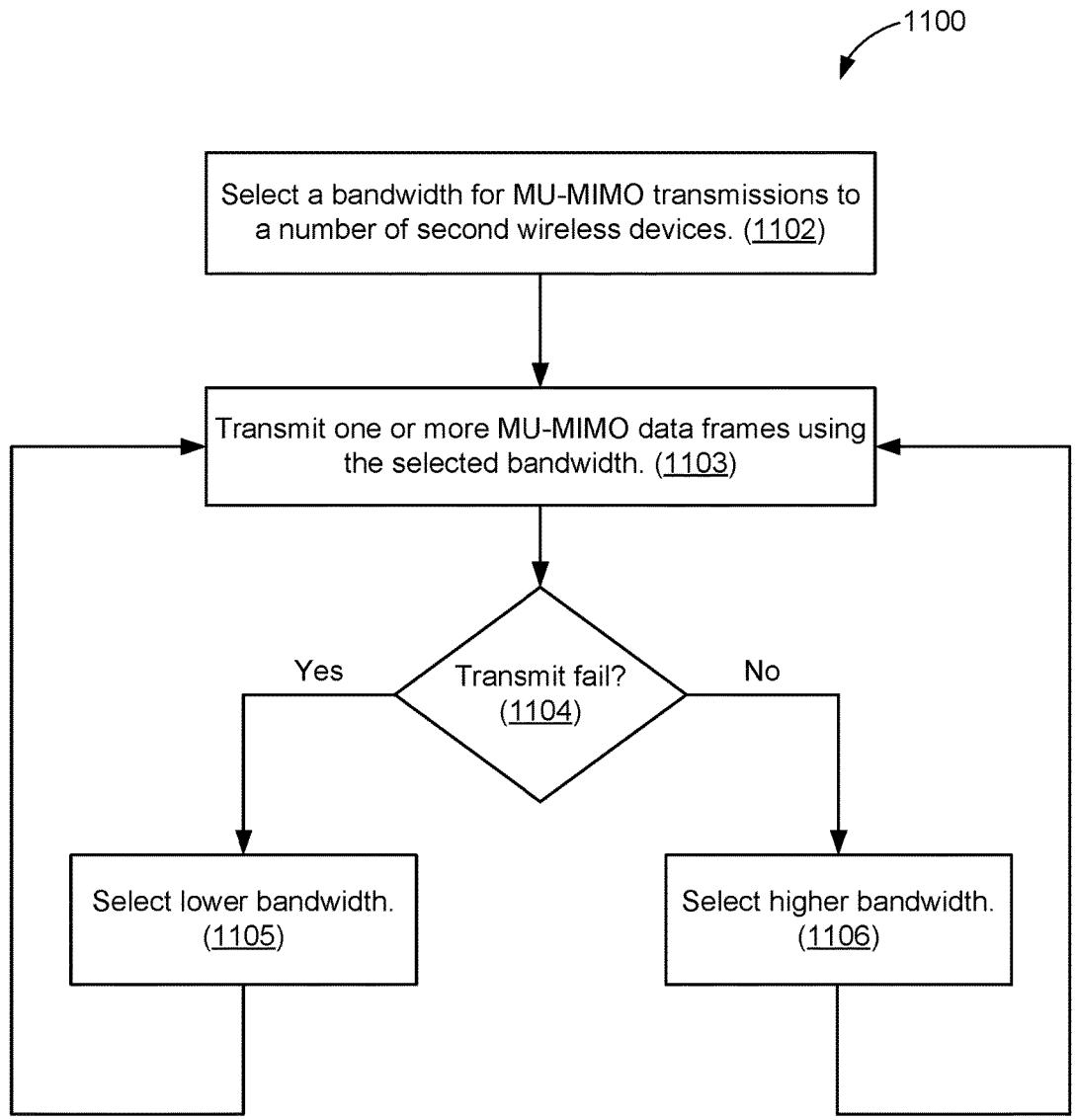
FIG. 11 shows an illustrative flow chart depicting another example operation for selecting a bandwidth for MU-MIMO communications in accordance with example embodiments.

Memory 240 may also include a non-transitory computer-readable medium (e.g., one or more nonvolatile memory elements, such as EPROM, EEPROM, Flash memory, a hard drive, and so on) that may store at least the following software (SW) modules:
- a frame formatting and exchange software module 242 to facilitate the creation and exchange of any suitable frames (e.g., data frames, action frames, control frames, and management frames) between STA 200 and other wireless devices (e.g., as described below for one or more operations of FIGS. 9-11);
- a channel access software module 243 to contend for medium access using a bandwidth that may be based, at least in part, on channel information provided by the channel access mechanism 223 (or other suitable components of STA 200) and/or on a success/fail status of one or more previous data transmissions (e.g., as described below for one or more operations of FIGS. 9-11);
- a clear channel determination software module 244 to facilitate the determination of channel availability and/or channel conditions of a bandwidth over which the STA 200 may communicate (e.g., as described below for one or more operations of FIGS. 9-11); and
- a channel access mode selection software module 245 to facilitate selecting and/or switching between channel access mechanism 223 and channel access SW module 243 (e.g., as described below for one or more operations of FIGS. 9-11).

Each software module includes instructions that, when executed by processor 230, cause STA 200 to perform the corresponding functions. The non-transitory computer-readable medium of memory 240 thus includes instructions for performing all or a portion of the operations described below with respect to FIGS. 9-11.

For example, processor 230 may execute the frame formatting and exchange software module 242 to facilitate the creation and exchange of any suitable frames (e.g., data frames, action frames, control frames, and management frames) between STA 200 and other wireless devices. Processor 230 may also execute the channel access software module 243 to contend for medium access using a bandwidth that may be based, at least in part, on channel information provided by the channel access mechanism 223 (or other suitable components of STA 200) and/or on a success/fail status of one or more previous data transmissions. In some aspects, the channel access software module 243 may operate according to a static channel access (SCA) mechanism, and may use the contention engines 221 to contend for medium access. Processor 230 may also execute the clear channel determination software module 244 to facilitate the determination of channel availability and/or channel conditions of a bandwidth over which the STA 200 may communicate. Processor 230 may further execute the channel access mode selection software module 245 to facilitate selecting and/or switching between channel access mechanism 223 and channel access software module 243.

Figure 3:
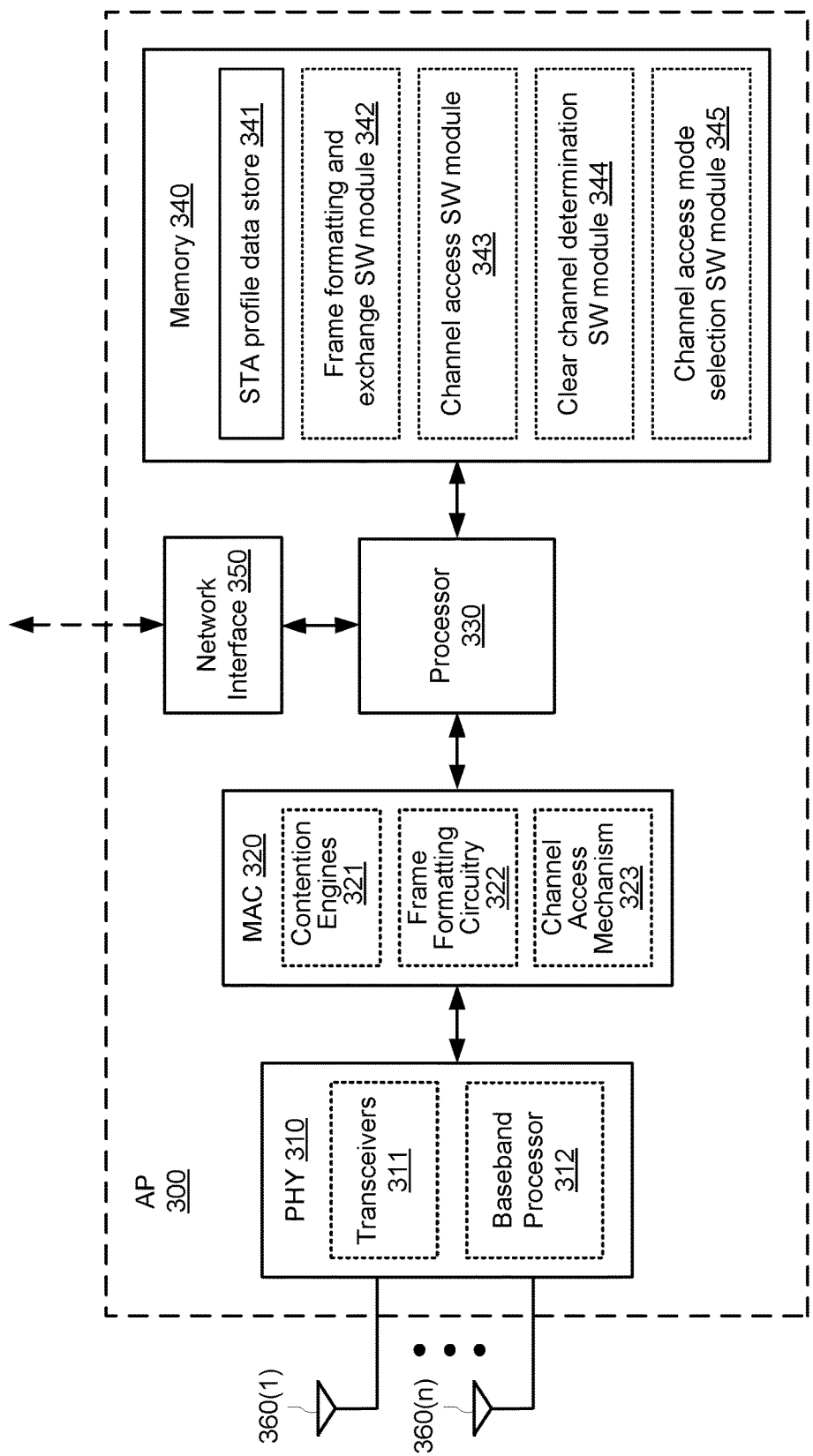
FIG. 3 shows a block diagram of an access point (AP) in accordance with example embodiments.

FIG. 3 shows an example AP 300 that may be one embodiment of the AP 110 of FIG. 1. AP 300 may include a PHY device 310, may include a MAC 320, may include a processor 330, may include a memory 340, may include a network interface 350, and may include a number of antennas 360(1)-360(n).

The PHY device 310 may include at least a number of transceivers 311 and a baseband processor 312. The transceivers 311 may be coupled to antennas 360(1)-360(n), either directly or through an antenna selection circuit (not shown for simplicity). The transceivers 311 may be used to communicate wirelessly with one or more STAs, with one or more other APs, and/or with other suitable devices. Although not shown in FIG. 3 for simplicity, the transceivers 311 may include any number of transmit chains to process and transmit signals to other wireless devices via antennas 360(1)-360(n), and may include any number of receive chains to process signals received from antennas 360(1)-360(n). Thus, for example embodiments, the AP 300 may be configured for MIMO operations including, for example, SU-MIMO operations and MU-MIMO operations.

The baseband processor 312 may be used to process signals received from processor 330 and/or memory 340 and to forward the processed signals to transceivers 311 for transmission via one or more of antennas 360(1)-360(n), and may be used to process signals received from one or more of antennas 360(1)-360(n) via transceivers 311 and to forward the processed signals to processor 330 and/or memory 340.

The network interface 350 may be used to communicate with a WLAN server (not shown for simplicity) either directly or via one or more intervening networks and to transmit signals.

Processor 330, which is coupled to PHY device 310, to MAC 320, to memory 340, and to network interface 350, may be any suitable one or more processors capable of executing scripts or instructions of one or more software programs stored in AP 300 (e.g., within memory 340). For purposes of discussion herein, MAC 320 is shown in FIG. 3 as being coupled between PHY device 310 and processor 330. For actual embodiments, PHY device 310, MAC 320, processor 330, memory 340, and/or network interface 350 may be connected together using one or more buses (not shown for simplicity).

The MAC 320 may include at least a number of contention engines 321, frame formatting circuitry 322, and a channel access mechanism 323. The contention engines 321 may contend for access to the shared wireless medium, and may also store packets for transmission over the shared wireless medium. For some embodiments, AP 300 may include one or more contention engines 321 for each of a plurality of different access categories. For other embodiments, the contention engines 321 may be separate from MAC 320. For still other embodiments, the contention engines 321 may be implemented as one or more software modules (e.g., stored in memory 340 or within memory provided within MAC 320) containing instructions that, when executed by processor 330, perform the functions of contention engines 321.

The channel access mechanism 323 may contend for medium access using different bandwidths and/or may dynamically adjust the bandwidth used for some data transmissions. In some aspects, the channel access mechanism 323 may operate according to a dynamic channel access (DCA) mechanism, and may use the contention engines 321 to contend for medium access. In addition, the channel access mechanism 323 may initiate and/or control clear channel assessment (CCA) operations to determine the availability of a number of channels associated with the wireless medium. Although depicted in the example of FIG. 3 as included within MAC 320, for other embodiments, the channel access mechanism 323 may be separate from MAC 320.

The frame formatting circuitry 322 may be used to create and/or format frames received from processor 330 and/or memory 340 (e.g., by adding MAC headers to PDUs provided by processor 330), and may be used to re-format frames received from PHY device 310 (e.g., by stripping MAC headers from frames received from PHY device 310).

Memory 340 may include a STA profile data store 341 that stores profile information for a plurality of STAs. The profile information for a particular STA may include, for example, its MAC address, previous AP-initiated channel sounding requests, supported data rates, connection history with AP 300, and any other suitable information pertaining to or describing the operation of the STA.

Memory 340 may also include a non-transitory computer-readable medium (e.g., one or more nonvolatile memory elements, such as EPROM, EEPROM, Flash memory, a hard drive, and so on) that may store at least the following software (SW) modules:

a frame formatting and exchange software module 342 to facilitate the creation and exchange of any suitable frames (e.g., data frames, action frames, control frames, and management frames) between AP 300 and other wireless devices (e.g., as described below for one or more operations of FIGS. 9-11);

a channel access software module 343 to contend for medium access using a bandwidth that may be based, at least in part, on channel information provided by the channel access mechanism 323 (or other suitable components of AP 300) and/or on a success/fail status of one or more previous data transmissions (e.g., as described below for one or more operations of FIGS. 9-11);

a clear channel determination software module 344 to facilitate the determination of channel availability and/or channel conditions of a bandwidth over which the AP 300 may communicate (e.g., as described below for one or more operations of FIGS. 9-11); and a channel access mode selection software module 345 to facilitate selecting and/or switching between channel access mechanism 323 and channel access software module 343 (e.g., as described below for one or more operations of FIGS. 9-11).

Each software module includes instructions that, when executed by processor 330, cause AP 300 to perform the corresponding functions. The non-transitory computer-readable medium of memory 340 thus includes instructions for performing all or a portion of the operations described below with respect to FIGS. 9-11.

For example, processor 330 may execute the frame formatting and exchange software module 342 to facilitate the creation and exchange of any suitable frames (e.g., data frames, action frames, control frames, and management frames) between AP 300 and other wireless devices. Processor 330 may also execute the channel access software module 343 to contend for medium access using a bandwidth that may be based, at least in part, on channel information provided by the channel access mechanism 323 (or other suitable components of AP 300) and/or on a success/fail status of one or more previous data transmissions. In some aspects, the channel access software module 343 may operate according to an SCA mechanism, and may use the contention engines 321 to contend for medium access. Processor 330 may also execute the clear channel determination software module 344 to facilitate the determination channel availability and/or channel conditions of a bandwidth over which the AP 300 may communicate. Processor 330 may further execute the channel access mode selection software module 345 to facilitate selecting and/or switching between channel access mechanism 323 and channel access software module 343.

As mentioned above, to reduce collisions on a shared wireless medium, wireless devices typically contend with each other for access to the shared wireless medium. For example, the IEEE 802.11 standards define a distributed coordination function (DCF) that instructs wireless devices (e.g., STAs and APs) to "listen" to the medium to determine when the medium is idle (e.g., using a "carrier sense" technique), and then select a random back-off number or period before attempting to gain access to the medium. Because each wireless device selects a random back-off number or period, the probability of collisions resulting from multiple wireless devices attempting to access the shared wireless medium at the same time may be reduced (e.g., compared to wireless networks that do not arbitrate access to the shared wireless medium).

Figure 4:
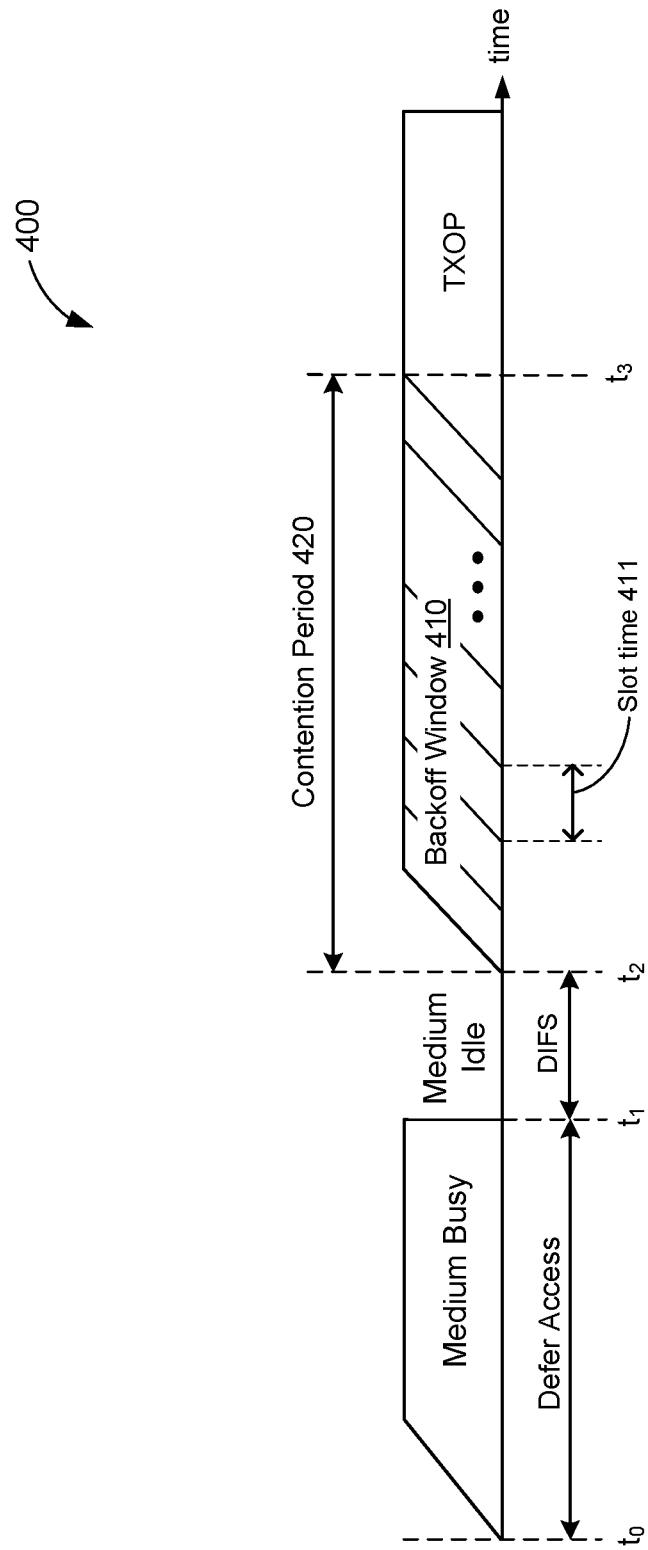
FIG. 4 depicts an example operation for gaining access to a narrowband wireless medium.

FIG. 4 depicts an example contention operation 400 that may be used by a wireless device to gain access to a narrowband wireless medium (e.g., a wireless medium consisting of a single 20 MHz channel) using a carrier sense multiple access with collision avoidance (CSMA/CA) technique, for example, as described in the IEEE 802.11 standards. At time $t_0$, the wireless device listens to the medium to determine whether the medium is idle or busy. If the medium is busy, as indicated by the "medium busy" between times $t_0$ and $t_1$, then the wireless device defers channel access operations. Conversely, if the wireless device detects that the medium has been continuously idle for a distributed coordination function (DCF) Interframe Space (DIFS) interval, as indicated by the "medium idle" between times $t_1$ and $t_2$, then a contention period 420 begins during which the wireless device may contend for medium access with other wireless devices.

More specifically, to prevent multiple devices from accessing the wireless medium at the same time, each device may select a random "back-off" number or period. The back-off number may correspond to a slot time 411 in a corresponding back-off window 410. If the wireless medium remains continuously idle during the DIFS duration (e.g., between times $t_1$ and $t_2$), then the contention period 420 begins. During the contention period 420 (e.g., between times $t_2$ and $t_3$), each device waits for a period of time determined by its back-off number (e.g., its back-off period) before it attempts to transmit data on the medium. The device that selects the lowest back-off number has the shortest back-off period (e.g., and thus the earliest one of the slot times 411), and therefore "wins" the medium access contention operation. If the wireless medium is still idle at the end of the back-off window 410 (at time $t_3$), then the winning device may be granted access to the shared wireless medium for a period of time commonly referred to as the transmit opportunity (TXOP). The winning device may transmit data over the shared wireless medium during the TXOP. For the example depicted in FIG. 4, the wireless device is granted a TXOP at time $t_3$, and may transmit data to other wireless devices during the granted TXOP.

Figure 5:
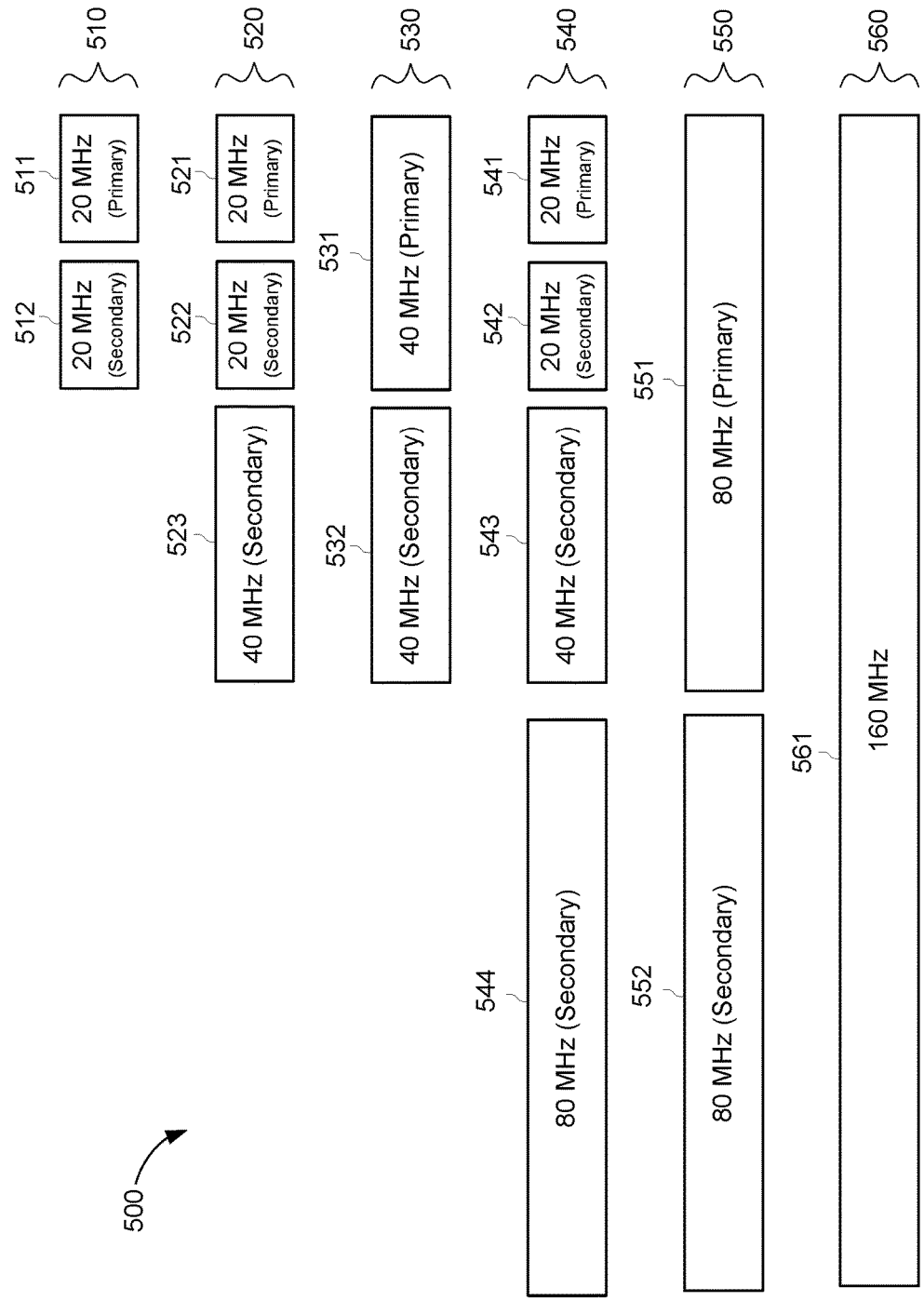
FIG. 5 shows a diagram of example channel bandwidth allocations that may be used with the example embodiments.

As mentioned above, a wideband wireless medium may be divided into a primary channel and one or more secondary channels. The primary and secondary channels may be of various bandwidths, and may be formed by bonding a number of 20 MHz-wide channels together to form 40 MHz-wide channels, 80 MHz-wide channels, and/or 160 MHz-wide channels. For example, FIG. 5 depicts an example channel bandwidth allocation map 500 that may be used with the example embodiments. The example channel bandwidth allocation map 500 is shown to include six possible channel bandwidth allocations 510, 520, 530, 540, 550, and 560. For other implementations, other channel bandwidth allocations may be used. As depicted in FIG. 5, the first example channel bandwidth allocation 510 divides a 40 MHz frequency spectrum into a primary 20 MHz channel 511 and a secondary 20 MHz channel 512. The second example channel bandwidth allocation 520 divides an 80 MHz frequency spectrum into a primary 20 MHz channel 521, a secondary 20 MHz channel 522, and a secondary 40 MHz channel 523. The third example channel bandwidth allocation 530 divides an 80 MHz frequency spectrum into a primary 40 MHz channel 531 and a secondary 40 MHz channel 532. The fourth example channel bandwidth allocation 540 divides a 160 MHz frequency spectrum into a primary 20 MHz channel 541, a secondary 20 MHz channel 542, a secondary 40 MHz channel 543, and a secondary 80 MHz channel 544. The fifth example channel bandwidth allocation 550 divides a 160 MHz frequency spectrum into a primary 80 MHz channel 551 and a secondary 80 MHz channel 552. The sixth example channel bandwidth allocation 560 includes a 160 MHz channel 561.

As described above, channel access mechanisms used for wireless mediums divided into a primary channel and one or more secondary channels may be classified as static or dynamic. A wireless device using an SCA mechanism typically attempts to transmit data using the entire bandwidth of the wireless medium, and if any portion of the bandwidth is busy, the wireless device typically defers channel access until the entire bandwidth becomes available. When the entire bandwidth becomes available, the wireless device may gain medium access and thereafter transmit data using the entire bandwidth of the wireless medium. It is noted that although the bandwidth for which SCA mechanisms attempt to gain medium access is static, SCA mechanisms may be programmed with different bandwidths. For example, the SCA mechanism (e.g., as may be implemented by executing the channel access software module 243 of FIG. 2 or the channel access software module 343 of FIG. 3) may be programmed to attempt to gain access to a 20 MHz portion, a 40 MHz portion, an 80 MHz portion, or a 160 MHz portion of the wireless medium. However, once the SCA mechanism contends for access to a selected bandwidth of the wireless medium, subsequent data transmissions resulting from winning the contention operation are performed using the selected bandwidth.

Figure 6A:
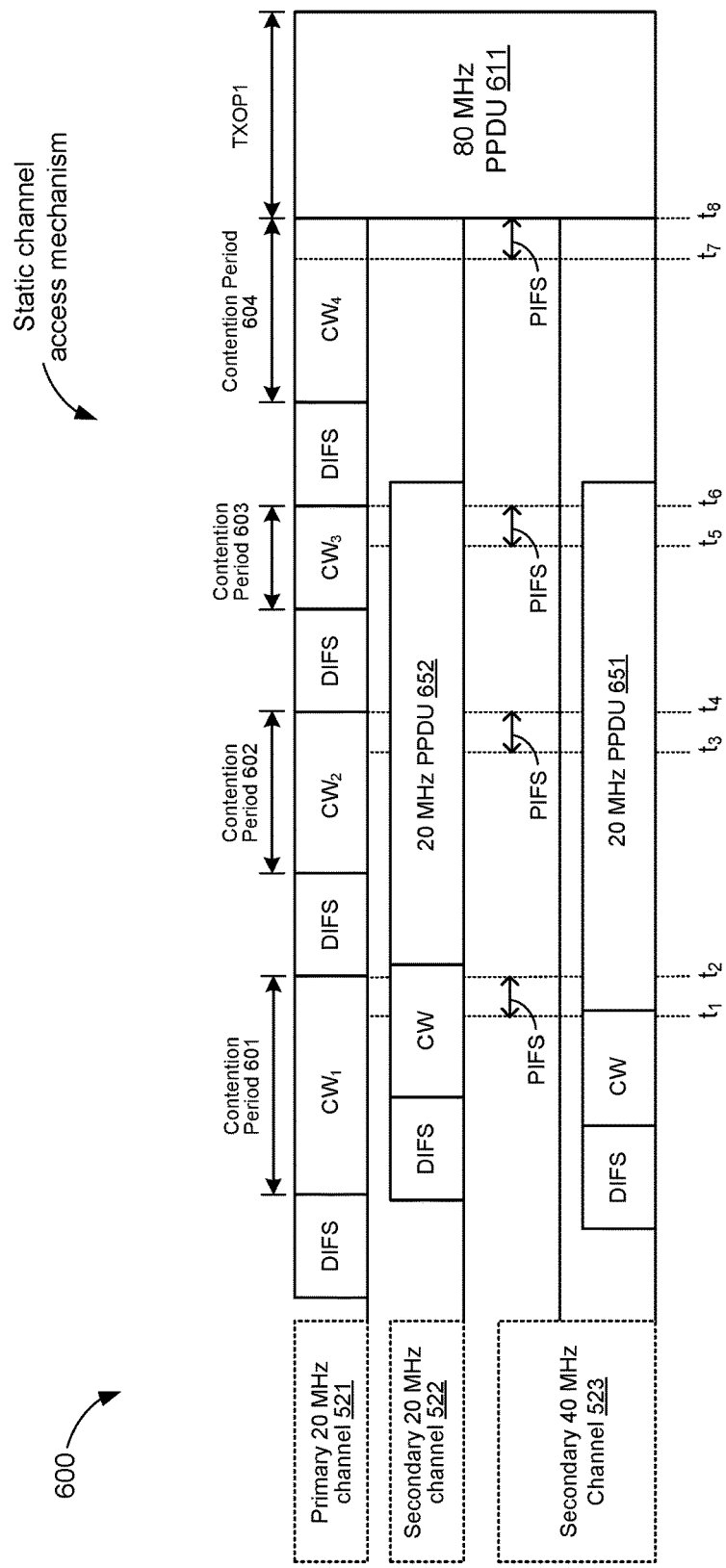
FIG. 6A depicts an example operation for gaining access to a wideband wireless medium using a static channel access mechanism.

For example, FIG. 6A depicts an example operation 600 of a wireless device gaining access to a wideband wireless medium using a static channel access (SCA) mechanism. For the example of FIG. 6A, the wireless medium is divided into a primary 20 MHz channel 521, a secondary 20 MHz channel 522, and a secondary 40 MHz channel 523, and the SCA mechanism is programmed to contend for access to the entire 80 MHz bandwidth of the wireless medium. For other implementations, the wireless medium may be divided into other numbers of channels having other suitable bandwidths (e.g., according to other suitable channel allocation maps), and the SCA mechanism may be programmed to contend for access to a selected portion of the 80 MHz bandwidth.

The wireless device may contend for access to the primary 20 MHz channel 521 in a manner similar to that described above with respect to FIG. 4. For example, after the wireless device senses that the primary 20 MHz channel 521 has been idle for a DIFS interval, a contention period begins. The wireless device selects a random back-off number, and begins counting down. When the back-off counter reaches zero, the wireless device may access the wireless medium if the primary 20 MHz channel 521 is still idle (e.g., if another device having a lower back-off number did not access the wireless medium).

However, because the SCA mechanism is programmed to gain access to the entire 80 MHz bandwidth of the wireless medium of FIG. 6A, the wireless device will defer access to the wireless medium unless the primary channel 521 and both of the secondary channels 522-523 are available. More specifically, if both the secondary 20 MHz channel 522 and the secondary 40 MHz channel 523 have been idle for a point coordination function (PCF) interframe space (P IFS) interval that precedes the end of the contention period, then the wireless device may gain medium access and begin data transmissions using the entire 80 MHz bandwidth of the wireless medium (e.g., by transmitting on the primary 20 MHz channel 521, the secondary 20 MHz channel 522, and the secondary 40 MHz channel 523). Conversely, if either the secondary 20 MHz channel 522 or the secondary 40 MHz channel 523 is busy during the PIFS interval, then the wireless device may defer channel access (e.g., until the entire 80 MHz bandwidth is available).

For the example operation 600 of FIG. 6A, the wireless device may gain access to the primary 20 MHz channel 521 at the end of the first contention period 601 at time $t_2$ (e.g., by selecting the earliest slot time in the corresponding contention window $CW_1$). However, because the secondary 40 MHz channel 523 is busy during the PIFS interval that precedes the end of the first contention window $CW_1$ (e.g., between times $t_1$ and $t_2$), the wireless device defers medium access. For example, because a PPDU 651 is transmitted (e.g., by another wireless device) on the secondary 40 MHz channel 523 during the last PIFS interval of contention window $CW_1$, the wireless device defers access to the entire 80 MHz bandwidth of the wireless medium.

The wireless device may gain access to the primary 20 MHz channel 521 at the end of the second contention period 602 at time $t_4$ (e.g., by selecting the earliest slot time in the corresponding contention window $CW_2$). However, because both the secondary 20 MHz channel 522 and the secondary 40 MHz channel 523 are busy during the PIFS interval that precedes the end of the second contention window $CW_2$ (e.g., between times $t_3$ and $t_4$), the wireless device again defers medium access. For example, because PPDU 652 is transmitted on the secondary 20 MHz channel 522 and PPDU 651 is transmitted on the secondary 40 MHz channel 523 during the last PIFS interval of contention window $CW_2$, the wireless device again defers access to the entire 80 MHz bandwidth of the wireless medium.

The wireless device may again gain access to the primary 20 MHz channel 521 during the third contention period 603 after selecting the earliest slot time in corresponding contention window $CW_3$, but again defers medium access to the primary 20 MHz channel 521 because both the secondary 20 MHz channel 522 and the secondary 40 MHz channel 523 are still busy during the PIFS interval that precedes the end of the third contention window $CW_3$ (e.g., between times $t_5$ and $t_6$).

The wireless device may again gain access to the primary 20 MHz channel 521 during the fourth contention period 604 after selecting the earliest slot time in corresponding contention window $CW_4$. Here, because both the secondary 20 MHz channel 522 and the secondary 40 MHz channel 523 were idle during the PIFS interval that precedes the end of the fourth contention window $CW_4$ (e.g., between times $t_7$ and $t_8$), the wireless device gains access to the entire bandwidth of the wireless medium and transmits an 80 MHz PPDU 611 during TXOP1 beginning at time $t_8$.

A DCA mechanism may also initially attempt to gain access to the entire bandwidth of the wireless medium. However, in contrast to the SCA mechanism described above with respect to FIG. 6A, if the entire bandwidth is not available, then the DCA mechanism may dynamically adjust the bandwidth based on channel availability. More specifically, a wireless device using a DCA mechanism (e.g., such as channel access mechanism 223 of FIG. 2 or channel access mechanism 323 of FIG. 3) may initially attempt to gain access to both the primary and secondary channels of a wireless medium, and if the secondary channel is busy and the primary channel is available, then the wireless device may adjust its transmission frequency and transmit data only on the primary channel. Thereafter, the wireless device may again attempt to gain access to both the primary and secondary channels of the wireless medium, for example, during a subsequent medium access contention operation. If both the primary channel and the secondary channel are available during the subsequent medium access contention operation, then the wireless device may adjust the bandwidth of its data transmissions to include both the primary channel and the secondary channel.

Figure 6B:
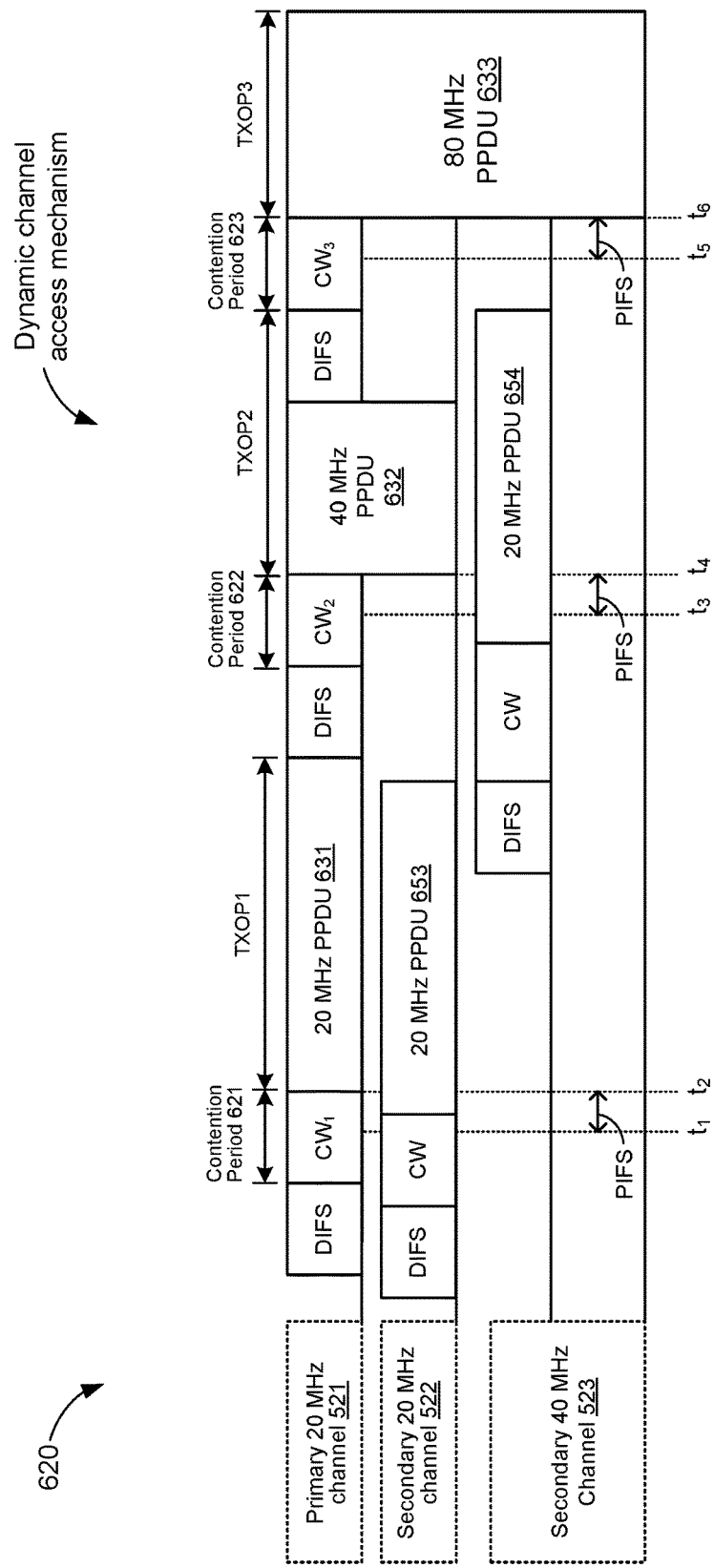
FIG. 6B depicts an example operation for gaining access to a wideband wireless medium using a dynamic channel access mechanism.

For example, FIG. 6B depicts an example operation 620 of a wireless device gaining access to a wideband wireless medium using a dynamic channel access (DCA) mechanism. Similar to the example of FIG. 6A, the wireless medium depicted in FIG. 6B is divided into primary 20 MHz channel 521, secondary 20 MHz channel 522, and secondary 40 MHz channel 523. For other implementations, the wireless medium may be divided into other numbers of channels having other suitable bandwidths (e.g., according to other suitable channel allocation maps).

The wireless device may contend for access to the primary 20 MHz channel 521 in a manner similar to that described above with respect to FIG. 4. For example, after the wireless device senses that the primary 20 MHz channel 521 has been idle for a DIFS interval, a contention period begins. The wireless device selects a random back-off number, and begins counting down. When the back-off counter reaches zero, the wireless device may gain medium access if the primary 20 MHz channel 521 is idle (e.g., if another device having a lower back-off number did not access the wireless medium). In contrast to the SCA mechanism used in the example operation 600 of FIG. 6A, if the primary 20 MHz channel 521 is available, the DCA mechanism used in the example operation 620 of FIG. 6B may begin transmissions on the primary 20 MHz channel 521 even if one or both of the secondary channels 522-523 are busy.

More specifically, as depicted in FIG. 6B, the wireless device is granted access to the primary 20 MHz channel 521 at the end of the first contention period 621 at time $t_2$ (e.g., by selecting the earliest slot time in the corresponding contention window $CW_1$). Even though the secondary 20 MHz channel 522 is busy (e.g., transmitting PPDU 653 from another wireless device) during the PIFS interval that precedes the end of the first contention window $CW_1$ (e.g., between times $t_1$ and $t_2$), the wireless device gains medium access and transmits a 20 MHz PPDU 631 on the primary 20 MHz channel 521 during TXOP1.

The wireless device is again granted access to the primary 20 MHz channel 521 at the end of the second contention period 622 at time $t_4$. The secondary 20 MHz channel 522 is idle during the PIFS interval that precedes the end of the second contention window $CW_2$ (e.g., between times $t_3$ and $t_4$), and therefore the wireless device may also gain access to the secondary 20 MHz channel 522. In response thereto, the wireless device may transmit a 40 MHz PPDU 632 using both the primary 20 MHz channel 521 and the secondary 20 MHz channel 522 during TXOP2. Note that the secondary 40 MHz channel 523 is busy (e.g., transmitting PPDU 654 from another wireless device) during the PIFS interval between times $t_3$ and $t_4$, and thus the wireless device may not use the secondary 40 MHz channel 523 during TXOP2.

The wireless device is again granted access to the primary 20 MHz channel 521 at the end of the third contention period 623 at time $t_6$. Both the secondary 20 MHz channel 522 and the secondary 40 MHz channel 523 are idle during the PIFS interval that precedes the end of the third contention window $CW_3$ (e.g., between times $t_5$ and $t_6$), and therefore the wireless device may also gain access to both the secondary 20 MHz channel 522 and the secondary 40 MHz channel 523. In response thereto, the wireless device may transmit an 80 MHz PPDU 633 using the primary channel 521 and both secondary channels 522-523 during TXOP3.

As described above, the DCA mechanism depicted in FIG. 6B may achieve greater medium utilization than the SCA mechanism depicted in FIG. 6A, for example, because the DCA mechanism does not defer medium access when one or more of the secondary channels are busy. Unfortunately, hardware-based DCA mechanisms may not be suitable for MU-MIMO communications. As a result, wireless devices contending for medium access to transmit MU-MIMO data packets are typically limited to software-based SCA mechanisms, which as described above may result in low medium utilization because of frequent channel access deferrals.

More specifically, hardware-based DCA mechanisms may not be suitable for medium access contention operations associated with MU-MIMO communications because of channel sounding operations associated with MU-MIMO communications. For example, to transmit MU-MIMO data using a selected bandwidth, the wireless device typically performs a channel sounding operation to determine channel conditions on the selected bandwidth, and then uses the determined channel conditions to calculate a steering matrix to be used for transmitting the MU-MIMO data. Because the steering matrix is based on channel feedback information for the bandwidth selected for the sounding operation, the bandwidth used for transmission of the MU-MIMO data should match the bandwidth of the sounding operation. However, because the bandwidth of frames used for sounding operations is typically programmed prior to the sounding operations, conventional DCA mechanisms may not be suitable for dynamically adjusting the bandwidth of MU-MIMO transmissions.

Accordingly, apparatuses and methods are disclosed for selecting and/or dynamically adjusting the bandwidth used for MU-MIMO data transmissions. For some embodiments, a first wireless device (such as an AP or a STA) may select the bandwidth for MU-MIMO data transmissions based on the success and/or failure of one or more previous transmissions of MU-MIMO data. In some aspects, if a number of previous transmissions of MU-MIMO data using a given bandwidth were successful, then the first wireless device may increase the bandwidth to be used for the next attempted transmission of MU-MIMO data. Conversely, if a number of previous transmissions of MU-MIMO data using the given bandwidth were not successful (e.g., resulting in transmit failures), then the first wireless device may decrease the bandwidth to be used for the next attempted transmission of MU-MIMO data.

Figure 7A:
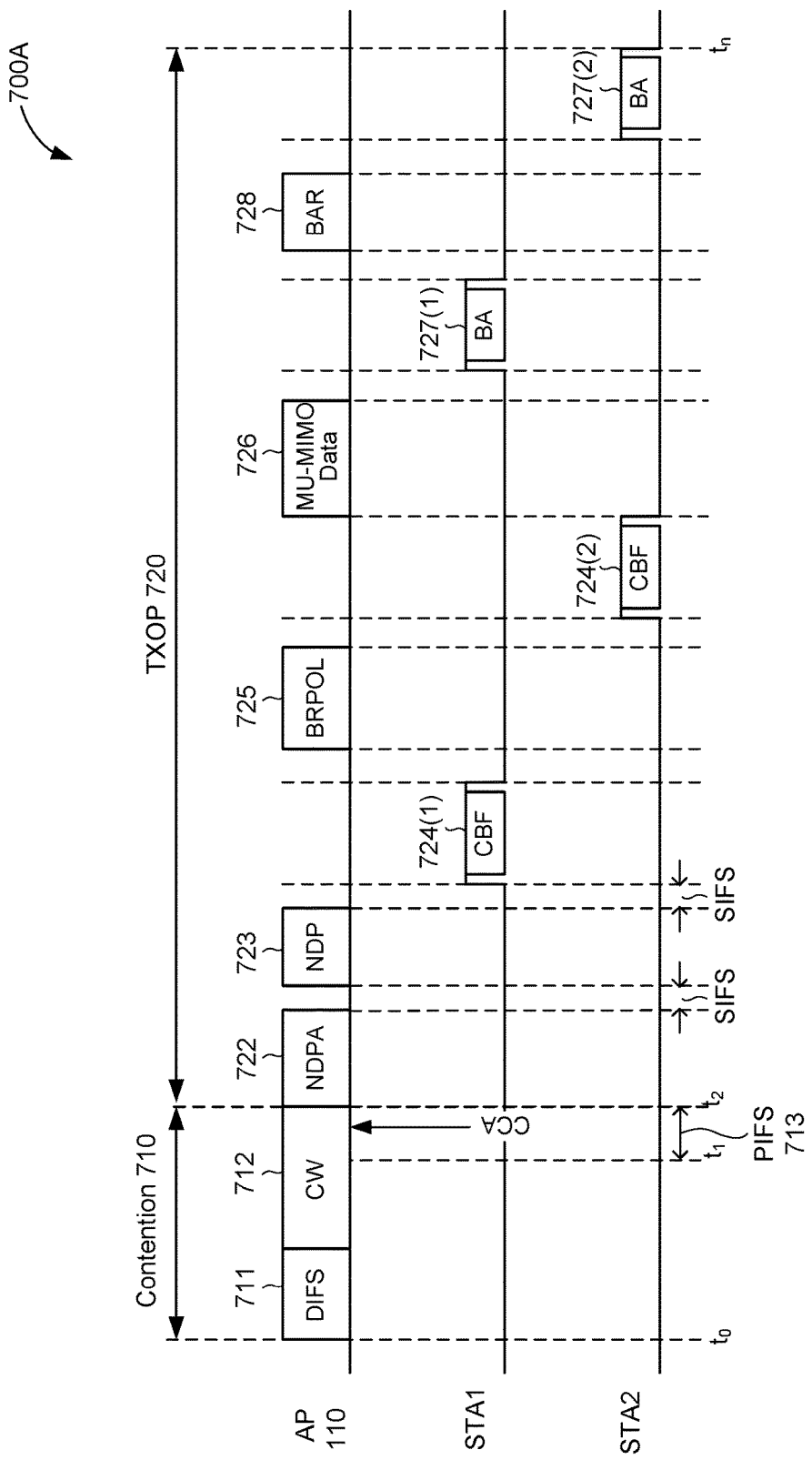
FIG. 7A shows a timing diagram of one example operation for selecting a bandwidth for MU-MIMO communications in accordance with example embodiments.

For example, FIG. 7A shows a timing diagram depicting an example operation 700A for selecting a bandwidth for MU-MIMO transmissions in accordance with example embodiments. Although the example operation 700A is described below in the context of AP 110 selecting a bandwidth for transmitting MU-MIMO data to stations STA1 and STA2, the AP 110 may perform the example operation 700A with any suitable number of stations. In addition, for other embodiments, a station may perform the example operation 700A of FIG. 7A to select a bandwidth for transmitting MU-MIMO data to any number of other suitable wireless devices. Further, although described below with respect to the example channel bandwidth allocation 520 depicted in FIG. 5, the example operation 700A may be performed on wireless mediums having other suitable channel bandwidths and/or channel allocations.

As depicted in FIG. 7A, the example operation 700A is shown to include a contention period 710 followed by a TXOP 720. Referring also to FIG. 3, in some aspects, the channel access SW module 343 may select a bandwidth for a sounding operation and associated MU-MIMO data transmission during TXOP 720 based on the success and/or failure of one or more previous MU-MIMO data transmissions. More specifically, the channel access SW module 343 may program a channel width of a null data packet announcement (NDPA) frame 722 and a null data packet (NDP) 723 based on the selected bandwidth. For one example, if a number of previous 80 MHz MU-MIMO transmissions (e.g., using the primary 20 MHz channel 521, the secondary 20 MHz channel 522, and the secondary 40 MHz channel 523) were successful, then the channel access SW module 343 may program the NDPA frame 722 and the NDP 723 to have a channel width of 80 MHz. For another example, if a number of previous 80 MHz MU-MIMO transmissions resulted in failures, then the channel access SW module 343 may decrease the bandwidth, for example, by programming the NDPA frame 722 and the NDP 723 to have a channel width of 40 MHz. For yet another example, if a number of previous 20 MHz MU-MIMO transmissions (e.g., using only the primary 20 MHz channel 521) were successful, then the channel access SW module 343 may increase the bandwidth, for example, by programming the NDPA frame 722 and the NDP 723 to have a channel width of 40 MHz.

For the example operation 700A described below, it is assumed that the channel access SW module 343 selects a bandwidth of 40 MHz for the sounding operation and transmission of MU-MIMO data during the TXOP 720. More specifically, during the contention period 710, the AP 110 may perform CCA operations to determine whether the bandwidth selected for the sounding operation and transmission of the MU-MIMO data is available. Thus, for the example operation 700A described herein, the AP 110 may probe a 40 MHz-wide channel by performing CCA operations to determine whether the primary 20 MHz channel 521 and the secondary 20 MHz channel 522 are available. In some aspects, the AP 110 may detect energy received on the primary 20 MHz channel 521 and the secondary 20 MHz channel 522 to determine whether the selected 40 MHz bandwidth is available. In other aspects, the AP 110 may use carrier sense techniques (e.g., by decoding incoming Wi-Fi signal preambles) to determine whether the primary 20 MHz channel 521 and the secondary 20 MHz channel 522 are busy or idle.

If the AP 110 determines that the primary 20 MHz channel 521 has been continuously idle for a DIFS interval 711, the AP 110 may select a random back-off number and then begin decrementing its back-off counter. When the back-off counter reaches a value of zero (e.g., corresponding to the end of contention window 712), the AP 110 may contend for medium access. Prior to the end of the contention period 710, the AP 110 may determine whether the secondary 20 MHz channel 522 is available during the PIFS interval 713 that precedes the end of the contention window 712 (e.g., between times $t_1$ and $t_2$). In some aspects, the results of the CCA operations performed during the contention period 710 may be stored in a suitable memory or counter from which information indicating whether the secondary 20 MHz channel 522 was idle during the PIFS interval 713.

The channel availability information may be used to determine whether the AP 110 gains medium access or defers medium access at the end of the contention period 710. More specifically, if the secondary 20 MHz channel 522 is busy during the PIFS interval 713, then the AP 110 may defer medium access and flush any packets that were to be transmitted, for example, because the NDPA frame 722 and the NDP 723 are already programmed with a 40 MHz channel width. In other words, if the 40 MHz bandwidth selected for the sounding operation and transmission of MU-MIMO data during TXOP 720 is not available, then the AP 110 may defer medium access and report a CCA abort error. Conversely, if both the primary 20 MHz channel 521 and the secondary 20 MHz channel 522 are still idle during the PIFS interval 713, then the AP 110 may gain medium access and initiate the sounding operation using the 40 MHz bandwidth selected by the channel access SW module 343 (e.g., by transmitting on the primary 20 MHz channel 521 and the secondary 20 MHz channel 522).

For the example operation 700A, both the primary 20 MHz channel 521 and the secondary 20 MHz channel 522 are idle during the PIFS interval 713. Thus, at time $t_2$, the AP 110 gains access to the wireless medium for the TXOP 720, and transmits the NDPA 722 using the selected bandwidth of 40 MHz. The NDPA frame 722 may identify the stations STA1 and STA2, and may indicate an order in which the stations STA1 and STA2 are to provide channel feedback information to the AP 110.

Then, after a short interframe space (SIFS) interval, the AP 110 may transmit the NDP 723 to STA1 and STA2 using the selected bandwidth of 40 MHz. The NDP 723 may include a sequence of known signals or symbols (e.g., a training sequence). In response thereto, STA1 may transmit a compressed beamforming (CBF) frame 724(1) to the AP 110. The CBF frame 724(1) may include a feedback matrix calculated by STA1 based on the training sequence contained in the NDP 723.

The AP 110 may receive the CBF frame 724(1), and then transmit a beamforming report poll (BRPOL) frame 725 to STA2. The BRPOL frame 725 may indicate that STA2 is to transmit its feedback matrix to the AP 110. In response thereto, STA2 may transmit a CBF frame 724(2) to the AP 110. The CBF frame 724(2) may include a feedback matrix calculated by STA2 based on the training sequence contained in the NDP 723. After receiving CBF frames 724(1) and 724(2), the AP 110 may determine channel conditions for the selected bandwidth and/or may determine a steering matrix for beamforming MU-MIMO transmissions to STA1 and STA2.

The AP 110 may use the determined steering matrix to transmit MU-MIMO data 726 to stations STA1 and STA2 on the primary 20 MHz channel 521 and the secondary 20 MHz channel 522. STA1 may acknowledge receipt of the MU-MIMO data 726 by transmitting a block acknowledgment (BA) frame 727(1) to the AP 110. The AP 110 may then transmit a block acknowledgment request (BAR) 728 to STA2, which in response thereto may transmit a BA frame 727(2) to acknowledge receipt of the MU-MIMO data 726.

As described above, the example operation 700A of FIG. 7A may allow the channel access SW module 343 to select the bandwidth for MU-MIMO communications during TXOP 720 based on previous MU-MIMO data transmissions. However, because channel conditions may have changed since the previous TXOPs, selecting the bandwidth for MU-MIMO communications during TXOP 720 based on the success and/or failure of previous MU-MIMO data transmissions may result in an unacceptably high number of channel access deferrals.

Thus, in accordance with other embodiments, a first wireless device (such as an AP or a STA) may select a bandwidth for MU-MIMO data transmissions, confirm channel availability at the beginning of the TXOP, and then program the NDPA and NDP frames for the sounding operation with the selected bandwidth based on the confirmed channel availability. Thereafter, the first wireless device may perform the sounding operation using the programmed NDPA and NDP frames, and then transmit MU-MIMO data to one or more second wireless devices using the selected bandwidth. In this manner, the bandwidth selected for MU-MIMO communications may be based on real-time channel conditions (e.g., determined and/or confirmed during the TXOP) rather than on the success and/or failure of prior transmissions.

Figure 7B:
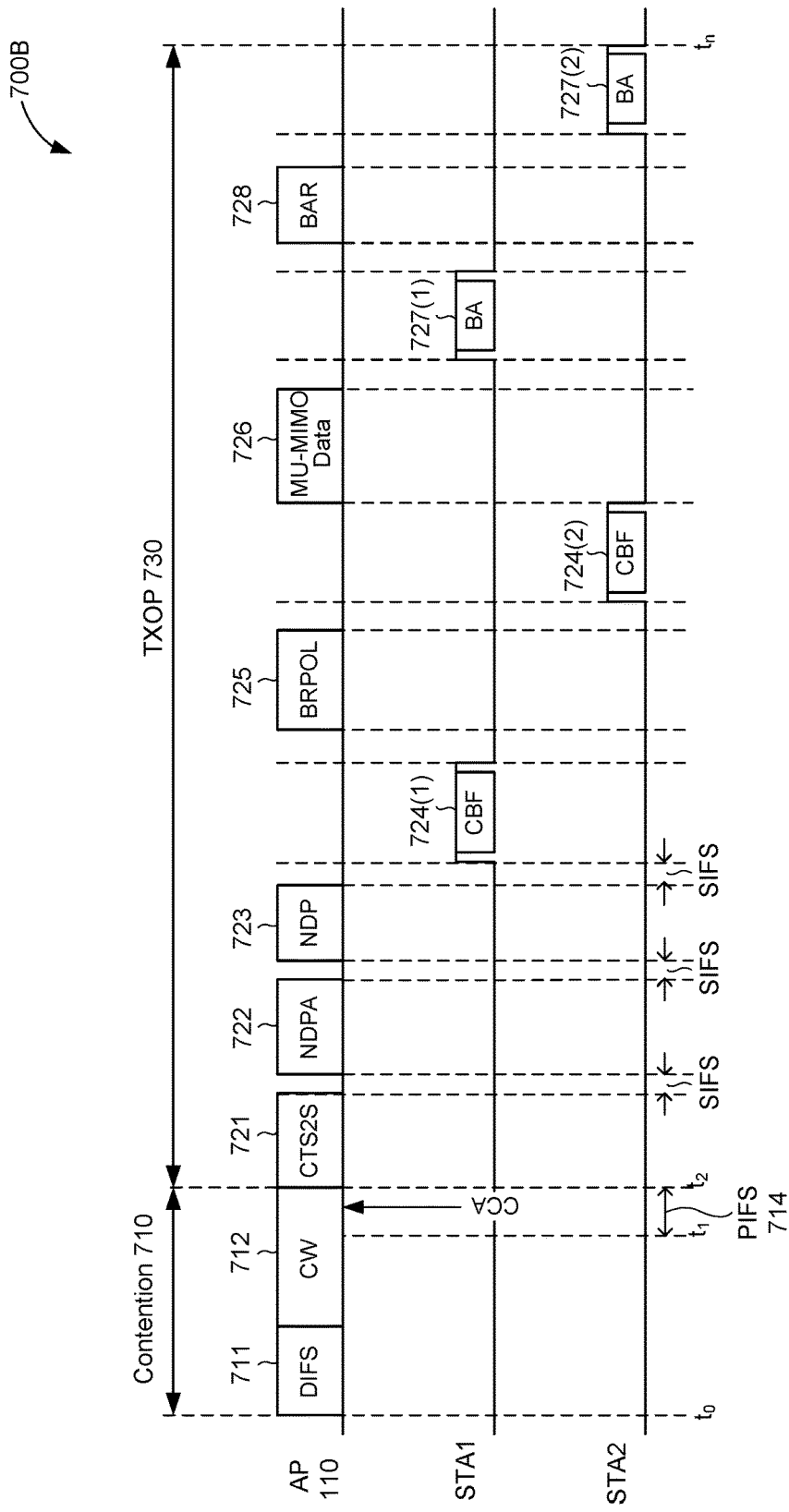
FIG. 7B shows a timing diagram of another example operation for selecting a bandwidth for MU-MIMO communications in accordance with example embodiments.

For example, FIG. 7B shows a timing diagram depicting another example operation 700B for selecting a bandwidth for MU-MIMO transmissions in accordance with example embodiments. Although the example operation 700B is described below in the context of AP 110 selecting a bandwidth for transmitting MU-MIMO data to stations STA1 and STA2, the AP 110 may perform the example operation 700B with any suitable number of stations. In addition, for other embodiments, a station may perform the example operation 700B of FIG. 7B to select a bandwidth for transmitting MU-MIMO data to any number of other suitable wireless devices. Further, although described below with respect to the example channel bandwidth allocation 520 depicted in FIG. 5, the example operation 700B may be performed on wireless mediums having other suitable channel bandwidths and/or channel allocations.

As depicted in FIG. 7B, the example operation 700B is shown to include a contention period 710 followed by a TXOP 730. During the contention period 710, the AP 110 may perform CCA operations to determine channel availability. More specifically, for the example of FIG. 7B, the AP 110 senses that the primary 20 MHz channel 521 has been continuously idle for a DIFS interval 711, selects a random back-off number, and begins decrementing its back-off counter until the back-off counter reaches zero (e.g., at the end of the contention window 712). The AP 110 may also determine (e.g., from results of the CCA operations) whether either of the secondary channels 522 and 523 are also idle during the PIFS interval 714 that precedes the end of the contention window 712 (e.g., between times $t_1$ and $t_2$).

At time $t_2$, the AP 110 gains access to the wireless medium for the TXOP 730, and may transmit a CTS-to-self (CTS2S) frame 721 on one or more selected channels of the wireless medium. The CTS2S frame 721 may indicate a time period during which stations STA1 and STA2 are to defer from contending for medium access, for example, to ensure that the AP 110 maintains medium access during the TXOP 730. More specifically, for at least some implementations, the channel access mechanism 323 of AP 110 may use channel availability information determined during the contention period 710 to select the bandwidth or channels upon which to transmit the CTS2S frame 721. For one example, if only the primary 20 MHz channel 521 is available, then the AP 110 may select a 20 MHz bandwidth for the CTS2S frame 721. For another example, if the primary 20 MHz channel 521 and the secondary 20 MHz channel 522 are available, then the AP 110 may select a 40 MHz bandwidth for the CTS2S frame 721. For another example, if the primary 20 MHz channel 521, the secondary 20 MHz channel 522, and the secondary 40 MHz channel 523 are all available, then the AP 110 may select an 80 MHz bandwidth for the CTS2S frame 721.

In some aspects, the AP 110 may concurrently transmit the CTS2S frame 721 on each of the available channels by duplicating a 20 MHz CTS2S frame transmission on a plurality of 20 MHz channels at the same time. For one example, if the primary 20 MHz channel 521 and the secondary 20 MHz channel 522 are available, then the AP 110 may employ a 40 MHz duplicate transmission format in which a 20 MHz CTS2S frame transmission is replicated on two (2) adjacent 20 MHz channels. For another example, if the primary 20 MHz channel 521, the secondary 20 MHz channel 522, and the secondary 40 MHz channel are all available, then the AP 110 may employ an 80 MHz duplicate transmission format in which a 20 MHz CTS2S frame transmission is replicated on four (4) adjacent 20 MHz channels. For other implementations in which a 160 MHz channel is available, the AP 110 may employ a 160 MHz duplicate transmission format in which a 20 MHz CTS2S frame transmission is replicated on eight (8) adjacent 20 MHz channels, or may employ an 80+80 MHz duplicate transmission format in which a 20 MHz CTS2S frame transmission is replicated in two frequency segments of four (4) adjacent 20 MHz channels.

For the example of FIG. 7B, it is assumed that the primary 20 MHz channel 521, the secondary 20 MHz channel 522, and the secondary 40 MHz channel 523 are all available during the PIFS interval 714. Thus, the AP 110 may transmit the CTS2S frame 721 using the entire 80 MHz bandwidth associated with the primary channel 521 and the secondary channels 522-523.

In accordance with the example embodiments, the channel access SW module 343 may be informed of the bandwidth and/or the channels upon which the CTS2S frames 721 were transmitted. For example, referring also to FIG. 3, the channel access mechanism 323 and/or a hardware controller (not shown for simplicity) associated with the PHY device 310 of AP 300 may inform the channel access software module 343 that the CTS2S frames 721 were transmitted using the entire 80 MHz bandwidth. In response thereto, the channel access SW module 343 may select a bandwidth of 80 MHz for the sounding operation and transmission of MU-MIMO data during the TXOP 730.

More specifically, the channel access SW module 343 may program the NDPA frame 722 and the NDP 723 for each of the bandwidths supported by the wireless medium. Thus, referring also to FIG. 5, the channel access SW module 343 may program the NDPA frame 722 and the NDP 723 for 20 MHz, 40 MHz, 80 MHz, and 160 MHz transmissions. Then, the NDPA frame 722 and the NDP 723 programmed for 80 MHz are selected for transmission during the TXOP 730 (e.g., based on the 80 MHz bandwidth used to transmit the CTS2S frame 721). In some aspects, the 80 MHz NDPA frame 722 and the 80 MHz NDP 723 (or at least parameters indicating the selected bandwidth of the NDPA frame 722 and the NDP 723) are provided to the channel access mechanism 323. In some aspects, the channel access SW module 343 may also program the BRPOL frame 725, the MU-MIMO data 726, and the BAR 728 using the selected bandwidth of 80 MHz.

In this manner, transmission of the CTS2S frames 721 may allow hardware controllers and/or the channel access mechanism 323 to inform the channel access SW module 343 of the selected bandwidth while also preventing other devices from gaining access to one or more channels corresponding to the selected bandwidth. In some aspects, transmission of the CTS2S frames 721 may result in additional feedback regarding the availability of the selected channels, thereby allowing the bandwidth of MU-MIMO communications to be selected based on real-time channel availability information. Thus, in contrast to the example operation 700A of FIG. 7A, the example operation 700B of FIG. 7B may allow the AP 110 to select a bandwidth for transmission of MU-MIMO data during TXOP 730 based on the availability of the primary 20 MHz channel 521, the secondary 20 MHz channel 522, and the secondary 40 MHz channel determined during contention period 710.

Then, after a SIFS interval, the AP 110 may perform a sounding operation on the wireless channels used to transmit the CTS2S frames 721, and thereafter transmit one or more MU-MIMO data frames to a number of second wireless devices on the wireless channels used to transmit the CTS2S frames. More specifically, for the example operation 700B of FIG. 7B, the AP 110 may transmit the NDPA frame 722 to stations STA1 and STA2 using the 80 MHz bandwidth associated with the primary 20 MHz channel 521, the secondary 20 MHz channel 522, and the secondary 40 MHz channel. As mentioned above, the NDPA frame 722 may identify the stations STA1 and STA2, and may indicate an order in which the stations STA1 and STA2 are to transmit respective CBF frames to the AP 110.

Then, the AP 110 may transmit the NDP 723 using the 80 MHz bandwidth associated with the primary 20 MHz channel 521, the secondary 20 MHz channel 522, and the secondary 40 MHz channel. In response thereto, STA1 may transmit a CBF frame 724(1) to the AP 110. The CBF frame 724(1) may include a feedback matrix calculated by STA1 based on a training sequence contained in the NDP 723. The AP 110 may receive the CBF frame 724(1), and then transmit a beamforming report poll (BRPOL) frame 725 to STA2. The BRPOL frame 725 may indicate that STA2 is to transmit its feedback matrix to the AP 110. In response thereto, STA2 may transmit a CBF frame 724(2) to the AP 110. The CBF frame 724(2) may include a feedback matrix calculated by STA2 based on the training sequence contained in the NDP 723. After receiving CBF frames 724(1) and 724(2), the AP 110 may determine channel conditions for the selected wireless channels 521-523 and/or may determine a steering matrix for beamforming MU-MIMO transmissions to STA1 and STA2.

The AP 110 may use the determined steering matrix to transmit MU-MIMO data 726 to stations STA1 and STA2 on the selected channels 521-523 (e.g., using an 80 MHz bandwidth). STA1 may acknowledge receipt of the MU-MIMO data 726 by transmitting a block acknowledgment (BA) frame 727(1) to the AP 110. The AP 110 may then transmit a block acknowledgment request (BAR) 728 to STA2, which in response thereto may transmit a BA frame 727(2) to acknowledge receipt of the MU-MIMO data 726.

Figure 8:
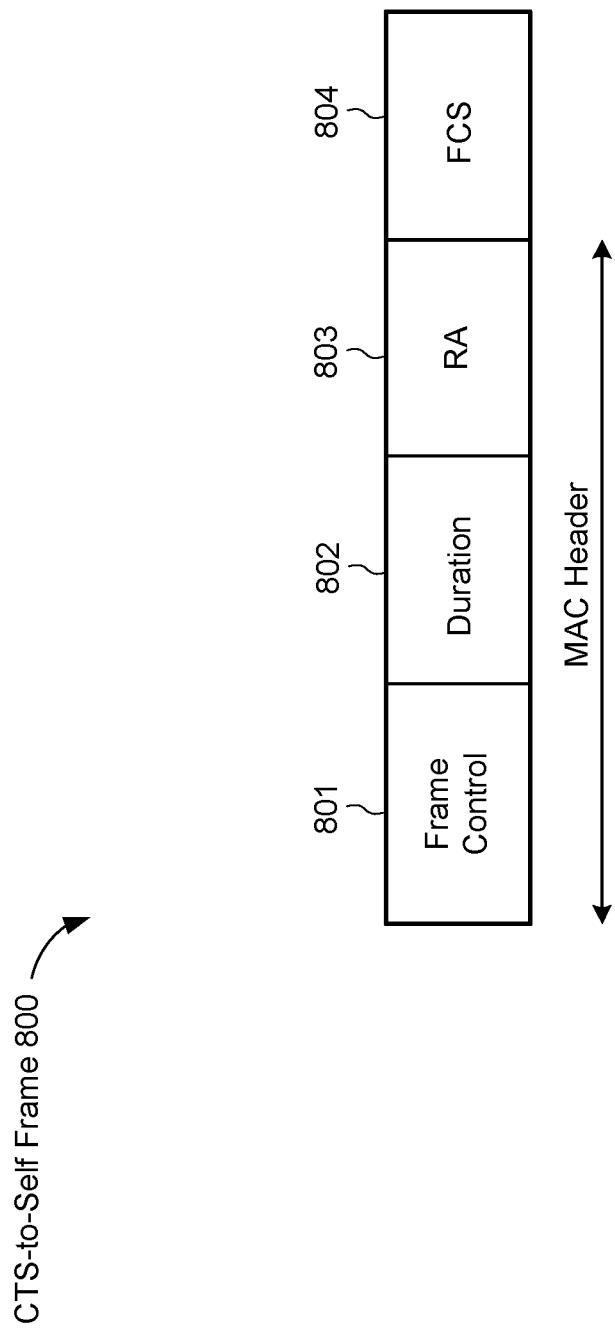
FIG. 8 shows an example CTS-to-Self frame in accordance with example embodiments.

FIG. 8 shows an example CTS2S frame 800 in accordance with example embodiments. The CTS2S frame 800 is shown to include a frame control field 801, a duration field 802, a Receiver Address (RA) field 803, and a Frame Check Sequence (FCS) field 804. The frame control field 801 may store frame information including, for example, frame type and subtype information, The duration field 802 may store a value indicating a duration of time for which other wireless devices are to refrain from attempting to access the shared wireless medium. The RA field 803 contains the MAC address of the AP 110, for example, to reserve the shared wireless medium for transmissions from AP 110 for the period of time indicated in the duration field 802. The FCS field 804 stores a check frame sequence that may be used for error detection.

In addition or as an alternative, a wireless device (e.g., the AP 110 and/or one of stations STA1-STA4 of FIG. 1) may use feedback from transmit successes and transmit failures to adjust the bandwidth used for MU-MIMO communications. More specifically, in some implementations, the wireless device may select an initial bandwidth for MU-MIMO communications, and then selectively adjust the bandwidth based on transmit failures and/or transmit success. In some aspects, the wireless device may initially select a maximum available bandwidth, and then attempt to transmit one or more MU-MIMO data frames using the maximum available bandwidth. If the transmission of the MU-MIMO data frames fails, then the wireless device may select a lower bandwidth for subsequent MU-MIMO communications. Conversely, if the transmission of the MU-MIMO data frames succeeds, then the wireless device may select a higher bandwidth for subsequent MU-MIMO communications.

For one example, if the transmission of MU-MIMO data on an 80 MHz wireless channel fails, then the wireless device may select a 40 MHz wireless channel for subsequent transmissions of MU-MIMO data. For another example, if the transmission of MU-MIMO data on an 80 MHz wireless channel succeeds, then the wireless device may select a 160 MHz wireless channel for subsequent transmissions of MU-MIMO data.

Additionally, the wireless device may periodically probe higher bandwidths after a successful MU-MIMO transmission. If the probing operation indicates that a higher bandwidth is available, then the wireless device may select the wireless channel corresponding to the higher bandwidth for one or more subsequent MU-MIMO communications. For example, referring again to FIG. 5, if the primary 20 MHz channel 521 is initially selected and transmission of MU-MIMO data succeeds, then the wireless device may probe a 40 MHz channel (e.g., the primary 20 MHz channel 521 and the secondary 20 MHz channel 522) to determine its availability. If the probing indicates that the 40 MHz channel is available, then the wireless device may adjust its transmission bandwidth to include both the primary 20 MHz channel 521 and the secondary 20 MHz channel 522. It is noted that selecting the bandwidth for probing operations based on the success and/or failure of one or more previous data transmissions may be one embodiment of the example operation 700A depicted in FIG. 7A.

For some implementations, the wireless device may selectively adjust its bandwidth based, at least in part, on interference levels on the wireless medium. For example, the wireless device may determine a level of interference on the wireless medium, and may then compare the determined levels of interference with an interference value. If the determined level of interference exceeds the interference value (e.g., indicating a relatively high level of interference on the wireless medium), then the wireless device may select the bandwidth for MU-MIMO communications in the manner described above with respect to FIG. 7B. Conversely, if the determined level of interference does not exceed the interference value (e.g., indicating a relatively low level of interference on the wireless medium), then the wireless device may select the bandwidth for MU-MIMO communications in the manner described above with respect to FIG. 7A.

In some implementations, the wireless device may maintain a moving average of the interference levels on the wireless medium, for example, by periodically measuring the interference levels on the wireless medium and then calculating the moving average for a time period. In this manner, the wireless device may use historical interference level information to determine when (and if) to dynamically adjust the bandwidth for MU-MIMO communications.

FIG. 9 is an illustrative flow chart depicting an example operation 900 for selecting a bandwidth for MU-MIMO transmissions in accordance with example embodiments. The example operation 900 is described below in the context of a first wireless device and a number of second wireless devices. Each of the first and second wireless devices may be any suitable wireless device such as, for example, an access point (e.g., AP 110 of FIG. 1 or AP 300 of FIG. 3) or a station (e.g., one of stations STA1-STA4 of FIG. 1 or STA 200 of FIG. 2).

The first wireless device may determine, during a medium access contention operation, whether one or more bandwidths are available (902). In some aspects, the first wireless device may perform CCA operations to determine whether the one or more bandwidths are available (902A). The CCA operations may determine whether a given wireless channel is busy or idle by either detecting energy on the wireless channel or by listening for frames transmitted on the wireless channel, for example, as described above.

The first wireless device may transmit, during a transmit opportunity (TXOP), a clear-to-send-to-self (CTS2S) frame on the bandwidth determined to be available (904). As mentioned above, transmitting a CTS2S frame may reserve the wireless medium for the time period indicated by the duration field of the CTS2S frame, and may also confirm (in real-time) the availability of the wireless channels determined to be idle during the contention period.

The first wireless device may select the bandwidth for MU-MIMO communications based on the bandwidth used to transmit the CTS2S frames (906). As described above with respect to FIG. 7B, a hardware controller of the first wireless device (e.g., channel access mechanism 223 of FIG. 2 or channel access mechanism 323 of FIG. 3) may inform an associated software-based channel access mechanism (e.g., channel access software module 243 of FIG. 2 or channel access software module 343 of FIG. 3) of the bandwidth used to transmit the CTS2S frames. The software-based channel access mechanism may use the bandwidth selected for transmission of the CTS2S frames to program the bandwidth of the NDPA frame and the NDP, and then provide the NDPA frame and the NDP (or at least parameters indicating the selected bandwidth of the NDPA frame and the NDP) to the hardware controller.

Next, the first wireless device may initiate the MU-MIMO communications using the selected bandwidth (908). More specifically, the first wireless device may perform a sounding operation on the selected bandwidth (e.g., used to transmit the CTS2S frames) (908A), for example, by transmitting the NDPA frame and the NDP using the selected bandwidth. Then, the first wireless device may transmit one or more MU-MIMO data frames to a number of second wireless devices using the selected bandwidth (908B).

Thereafter, the first wireless device may select one of a number of channel access mechanisms to use to selectively adjust the bandwidth of a subsequent (e.g., the next) MU-MIMO communication based on a level of interference on the wireless channels (910). More specifically, for at least some embodiments, the first wireless device may determine a level of interference on the wireless medium, may compare the level of interference with an interference value, and may then select one of the channel access mechanisms to use to selectively adjust the bandwidth of a subsequent (e.g., the next) MU-MIMO communication based on the comparing. In some aspects, the first wireless device may select the dynamic channel access mechanism described above with respect to the example operation 700B of FIG. 7B to selectively adjust the bandwidth of the subsequent MU-MIMO communication when the level of interference exceeds the interference value, and may select the static channel access mechanism described above with respect to the example operation 700A of FIG. 7A to selectively adjust the bandwidth of the subsequent MU-MIMO communication when the level of interference does not exceed the interference value.

FIG. 10 shows an illustrative flow chart depicting an example operation 1000 for performing a sounding operation in accordance with example embodiments. The example operation 1000 is described below in the context of a first wireless device and a number of second wireless devices. Each of the first and second wireless devices may be any suitable wireless device such as, for example, an access point (e.g., AP 110 of FIG. 1 or AP 300 of FIG. 3) or a station (e.g., one of stations STA1-STA4 of FIG. 1 or STA 200 of FIG. 2).

The first wireless device may configure a null data packet announcement (NDPA) frame with the selected bandwidth (1002). Then, the first wireless device may transmit, using the selected bandwidth upon which the CTS2S frames are transmitted, the NDPA frame to the number of second wireless devices (1004). Next, first wireless device may configure a null data packet (NDP) with the selected bandwidth (1006). Finally, the first wireless device may transmit, using the selected bandwidth, the NDP to the number of second wireless devices (1008).

FIG. 11 is an illustrative flow chart depicting an example operation 1100 for adjusting a bandwidth for MU-MIMO transmissions based on the success/fail status of one or more previous transmissions of MU-MIMO data, in accordance with example embodiments. The example operation 1100 is described below in the context of a first wireless device and a number of second wireless devices. Each of the first and second wireless devices may be any suitable wireless device such as, for example, an access point (e.g., AP 110 of FIG. 1 or AP 300 of FIG. 3) or a station (e.g., one of stations STA1-STA4 of FIG. 1 or STA 200 of FIG. 2).

As depicted in FIG. 11, the first wireless device may select a bandwidth for MU-MIMO transmissions to a number of second wireless devices (1102). The first wireless device may transmit one or more MU-MIMO data frames to at least one of the second wireless devices using the selected bandwidth (1103).

The first wireless device may use transmit success and failure information to determine when (and if) to dynamically adjust the bandwidth used for subsequent MU-MIMO transmissions. For example, if the first wireless device determines that the transmission of MU-MIMO data frames failed, as tested at 1104, then the first wireless device may reduce its bandwidth for subsequent data transmissions (1105). Then, the first wireless device may transmit subsequent MU-MIMO data frames using the newly selected bandwidth (1103). Conversely, if the first wireless device determines that the transmission of MU-MIMO data frames succeeded, as tested at 1104, then the first wireless device may increase its bandwidth for subsequent data transmissions (1106). Then, the first wireless device may transmit subsequent MU-MIMO data frames using the newly selected bandwidth (1103).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for selecting a bandwidth for multi-user multiple-input multiple-output (MU-MIMO) communications, the method performed by a first wireless device and comprising:
    determining, during a medium access contention operation, whether one or more bandwidths are available;
    transmitting, during a transmit opportunity (TXOP), a clear-to-send-to-self (CTS2S) frame on the bandwidth determined to be available;
    selecting the bandwidth for the MU-MIMO communications based on the bandwidth used to transmit the CTS2S frames;
    transmitting the MU-MIMO communications using the selected bandwidth;
    determining, after the transmitting, a level of interference on the selected bandwidth;
    comparing the level of interference with an interference value; and
    selectively adjusting a bandwidth for subsequent MU-MIMO communications, based on the comparing, by dynamically adjusting the bandwidth for subsequent MU-MIMO communications based on a success or failure of one or more previous transmissions of MU-MIMO data when the level of interference does not exceed the interference value.

2. The method of claim 1, wherein each of the one or more bandwidths is one member of the group consisting of a 20 MHz-wide channel, a 40 MHz-wide channel, an 80 MHz-wide channel, and a 160 MHz-wide channel.

3. The method of claim 1, wherein the determining comprises:
    performing a clear channel assessment (CCA) on the one or more bandwidths.

4. The method of claim 1, wherein transmitting the MU-MIMO communications comprises:
    performing a sounding operation on the selected bandwidth; and
    transmitting one or more MU-MIMO data frames to a number of second wireless devices using the selected bandwidth.

5. The method of claim 4, wherein performing the sounding operation comprises:
    configuring a null data packet announcement (NDPA) frame with the selected bandwidth; and
    transmitting, using the selected bandwidth, the NDPA frame to the number of second wireless devices.

6. The method of claim 5, wherein performing the sounding operation further comprises:

configuring a null data packet (NDP) with the selected bandwidth; and transmitting, using the selected bandwidth, the NDP to the number of second wireless devices.

7. The method of claim 1, wherein the selectively adjusting further comprises:

dynamically adjusting the bandwidth for subsequent MU-MIMO communications based on the bandwidth used to transmit the CTS2S frames when the level of interference exceeds the interference value.

8. A wireless device comprising:

one or more processors; and a memory configured to store instructions that, when executed by the one or more processors, cause the wireless device to select a bandwidth for multi-user multiple-input multiple-output (MU-MIMO) communications by:

determining, during a medium access contention operation, whether one or more bandwidths are available;

transmitting, during a transmit opportunity (TXOP), a clear-to-send-to-self (CTS2S) frame on the bandwidth determined to be available;

selecting the bandwidth for the MU-MIMO communications based on the bandwidth used to transmit the CTS2S frames;

transmitting the MU-MIMO communications using the selected bandwidth;

determining, after the transmitting, a level of interference on the selected bandwidth;

comparing the level of interference with an interference value; and selectively adjusting a bandwidth for subsequent MU-MIMO communications, based on the comparing, by dynamically adjusting the bandwidth for subsequent MU-MIMO communications based on a success or failure of one or more previous transmissions of MU-MIMO data when the level of interference does not exceed the interference value.

9. The wireless device of claim 8, wherein each of the one or more bandwidths is one member of the group consisting of a 20 MHz-wide channel, a 40 MHz-wide channel, an 80 MHz-wide channel, and a 160 MHz-wide channel.

10. The wireless device of claim 8, wherein execution of the instructions for determining whether one or more bandwidths are available causes the wireless device to:

perform a clear channel assessment (CCA) on the one or more bandwidths.

11. The wireless device of claim 8, wherein execution of the instructions for transmitting the MU-MIMO communications causes the wireless device to:

perform a sounding operation on the selected bandwidth; and transmit one or more MU-MIMO data frames to a number of second wireless devices using the selected bandwidth.

12. The wireless device of claim 11, wherein execution of the instructions to perform the sounding operation causes the wireless device to:

configure a null data packet announcement (NDPA) frame with the selected bandwidth; and transmit, using the selected bandwidth, the NDPA frame to the number of second wireless devices.

13. The wireless device of claim 12, wherein execution of the instructions to perform the sounding operation causes the wireless device to further:

configure a null data packet (NDP) with the selected bandwidth; and transmit, using the selected bandwidth, the NDP to the number of second wireless devices.

14. The wireless device of claim 8, wherein execution of the instructions to selectively adjust the bandwidth causes the wireless device to further:

dynamically adjust the bandwidth for subsequent MU-MIMO communications based on the bandwidth used to transmit the CTS2S frames when the level of interference exceeds the interference value.

15. A non-transitory computer-readable storage medium storing instructions that, when executed by one or more processors of a wireless device, cause the wireless device to select a bandwidth for multi-user multiple-input multiple-output (MU-MIMO) communications by performing operations comprising:

determining, during a medium access contention operation, whether one or more bandwidths are available;

transmitting, during a transmit opportunity (TXOP), a clear-to-send-to-self (CTS2S) frame on the bandwidth determined to be available;

selecting the bandwidth for the MU-MIMO communications based on the bandwidth used to transmit the CTS2S frames;

transmitting the MU-MIMO communications using the selected bandwidth;

determining, after the transmitting, a level of interference on the selected bandwidth;

comparing the level of interference with an interference value; and selectively adjusting a bandwidth for subsequent MU-MIMO communications, based on the comparing, by dynamically adjusting the bandwidth for subsequent MU-MIMO communications based on a success or failure of one or more previous transmissions of MU-MIMO data when the level of interference does not exceed the interference value.

16. The non-transitory computer-readable storage medium of claim 15, wherein execution of the instructions for determining causes the wireless device to perform operations further comprising:

performing a clear channel assessment (CCA) on the one or more bandwidths.

17. The non-transitory computer-readable storage medium of claim 15, wherein execution of the instructions for transmitting the MU-MIMO communications causes the wireless device to perform operations further comprising:

performing a sounding operation on the selected bandwidth; and transmitting one or more MU-MIMO data frames to a number of second wireless devices using the selected bandwidth.

18. The non-transitory computer-readable storage medium of claim 17, wherein execution of the instructions for performing the sounding operation causes the wireless device to perform operations comprising:

configuring a null data packet announcement (NDPA) frame with the selected bandwidth; and transmitting, using the selected bandwidth, the NDPA frame to the number of second wireless devices.

19. The non-transitory computer-readable storage medium of claim 18, wherein execution of the instructions for performing the sounding operation causes the wireless device to perform operations further comprising:

configuring a null data packet (NDP) with the selected bandwidth; and transmitting, using the selected bandwidth, the NDP to the number of second wireless devices.

20. The non-transitory computer-readable storage medium of claim 15, wherein execution of the instructions for selectively adjusting the bandwidth causes the wireless device to perform operations further comprising:
  dynamically adjusting the bandwidth for subsequent MU-MIMO communications based on the bandwidth used to transmit the CTS2S frames when the level of interference exceeds the interference value.

21. A wireless device for selecting a bandwidth for multi-user multiple-input multiple-output (MU-MIMO) communications, the wireless device comprising:
  means for determining, during a medium access contention operation, whether one or more bandwidths are available;
  means for transmitting, during a transmit opportunity (TXOP), a clear-to-send-to-self (CTS2S) frame on the bandwidth determined to be available;
  means for selecting the bandwidth for the MU-MIMO communications based on the bandwidth used to transmit the CTS2S frames;
  means for transmitting the MU-MIMO communications using the selected bandwidth;
  means for determining, after the transmitting, a level of interference on the selected bandwidth;
  means for comparing the level of interference with an interference value; and
  means for selectively adjusting a bandwidth for subsequent MU-MIMO communications, based on the comparing, by dynamically adjusting the bandwidth for subsequent MU-MIMO communications based on a success or failure of one or more previous transmissions of MU-MIMO data when the level of interference does not exceed the interference value.

22. The wireless device of claim 21, wherein the means for determining is to:
  perform a clear channel assessment (CCA) on the one or more bandwidths.

23. The wireless device of claim 21, wherein the means for transmitting the MU-MIMO communications comprises:
  means for performing a sounding operation on the selected bandwidth; and
  means for transmitting one or more MU-MIMO data frames to a number of second wireless devices using the selected bandwidth.

24. The wireless device of claim 23, wherein the means for performing the sounding operation is to:
  configure a null data packet announcement (NDPA) frame with the selected bandwidth; and
  transmit, using the selected bandwidth, the NDPA frame to the number of second wireless devices.

25. The wireless device of claim 23, wherein performing the sounding operation further comprises:
  configuring a null data packet (NDP) with the selected bandwidth; and
  transmitting, using the selected bandwidth, the NDP to the number of second wireless devices.

26. The wireless device of claim 21, wherein the means for selectively adjusting is further to:
  dynamically adjust the bandwidth for subsequent MU-MIMO communications based on the bandwidth used to transmit the CTS2S frames when the level of interference exceeds the interference value.

* * * * *